(12) United States Patent
Yamamoto et al.

(10) Patent No.: US 10,171,823 B2
(45) Date of Patent: Jan. 1, 2019

(54) IMAGE DECODING DEVICE AND IMAGE CODING DEVICE

(71) Applicant: Sharp Kabushiki Kaisha, Sakai, Osaka (JP)

(72) Inventors: Tomoyuki Yamamoto, Sakai (JP); Tomohiro Ikai, Sakai (JP); Takeshi Tsukuba, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 19 days.

(21) Appl. No.: 15/313,135

(22) PCT Filed: May 7, 2015

(86) PCT No.: PCT/JP2015/063233
§ 371 (c)(1),
(2) Date: Nov. 22, 2016

(87) PCT Pub. No.: WO2015/182342
PCT Pub. Date: Dec. 3, 2015

(65) Prior Publication Data
US 2017/0195680 A1    Jul. 6, 2017

(30) Foreign Application Priority Data

May 26, 2014 (JP) ................................. 2014-107651

(51) Int. Cl.
*H04N 19/39* (2014.01)
*H04N 19/70* (2014.01)
*H04N 19/30* (2014.01)
*H04N 19/59* (2014.01)
*H04N 19/105* (2014.01)
(Continued)

(52) U.S. Cl.
CPC .......... *H04N 19/39* (2014.11); *H04N 19/105* (2014.11); *H04N 19/136* (2014.11); *H04N 19/186* (2014.11); *H04N 19/30* (2014.11); *H04N 19/59* (2014.11); *H04N 19/70* (2014.11)

(58) Field of Classification Search
CPC ......... H04N 19/39; H04N 19/59; H04N 19/30
USPC ............................................. 382/233
See application file for complete search history.

(56) References Cited

U.S. PATENT DOCUMENTS

2014/0301456 A1* 10/2014 Wang ................... H04N 19/70
375/240.12

OTHER PUBLICATIONS

Ramasubramoniam, A.K., Signaling of extended spatial scalability for SHVC, Apr. 18-26, 2013, Joint Collaborative Team on Video Coding (JCT-VC) of ITU-T SG 16 WP 3 and ISO/IEC JTC 1/SC 29/WG 11 13th Meeting: Incheon KR, JCTVC-M0309r.*

(Continued)

*Primary Examiner* — Raj Chakraborty
(74) *Attorney, Agent, or Firm* — Keating & Bennett, LLP

(57) ABSTRACT

Even in a case in which a color format is a format other than 4:2:0, an image coding device and an image decoding device capable of accurately locating a reference pixel position in inter-layer image prediction are realized.
A hierarchical moving image decoding device (1) includes a parameter set decoding section (12) that decodes a scaled reference layer offset syntax that is coded in a chroma pixel unit and a predicted image generation section (1442) that derives a scale based on a scaled reference layer offset which is a product of the scaled reference layer offset syntax and a luminance chroma size ratio of a target layer picture and generates a predicted image.

6 Claims, 13 Drawing Sheets

(51) Int. Cl.
　　　H04N 19/136　　(2014.01)
　　　H04N 19/186　　(2014.01)

(56) References Cited

OTHER PUBLICATIONS

Sullivan, Gary J., Edits reflecting decisions recorded for frame packing arrangement SEI messages and display/cropping windows, Oct. 10-19, 2012, Joint Collaborative Team on Video Coding (JCT-VC) of ITU-T SG 16 WP 3 and ISO/IEC JTC 1/SC 29/WG 11 11th Meeting: Shanghai, CN, JCTVC-K0382.*

Yamamoto, Tomoyuki et al., AHG 13: Scale and reference position derivation for sub-region extraction, Jan. 9-17, 2014, Joint Collaborative Team on Video Coding (JCT-VC) of ITU-T SG 16 WP 3 and ISO/IEC JTC 1/SC 29/WG 11 16th Meeting: San Jose, US, JCTVC-P0049.*

Official Communication issued in International Patent Application No. PCT/JP2015/063233, dated Jul. 14, 2015.

Yamamoto et al., "AHG 13: Scale and reference position derivation for sub-region extraction", Joint Collaborative Team on Video Coding (JCT-VC) of ITU-T SG 16 WP 3 and ISO/IEC JTC 1/SC 29/WG 11, JCTVC-P0049, Jan. 9-17, 2014, pp. 1-4.

Sullivan, "Edits reflecting decisions recorded for frame packing arrangement SEI messages and display/cropping windows", Joint Collaborative Team on Video Coding (JCT-VC) of ITU-T SG 16 WP 3 and ISO/IEC JTC 1/SC 29/WG 11, JCTVC-K0382, Oct. 10-19, 2012, 10 pages.

Ramasubramonian et al., "Signaling of extended spatial scalability for SHVC", Joint Collaborative Team on Video Coding (JCT-VC) of ITU-T SG 16 WP 3 and ISO/IEC JTC 1/SC 29/WG 11, JCTVC-M0309r1, Apr. 18-26, 2013, pp. 1-4.

Yamamoto et al., "AHG 13: Sub-region extraction—position calculation and comparison of different approaches", Joint Collaborative Team on Video Coding (JCT-VC) of ITU-T SG 16 WP 3 and ISO/IEC JTC 1/SC 29/WG 11, JCTVC-Q0159, Mar. 27-Apr. 4, 2014, pp. 1-6.

Chen et al., "Preliminary version of High efficiency video coding (HEVC) scalable extension Draft 6", Joint Collaborative Team on Video Coding (JCT-VC) of ITU-T SG 16 WP 3 and ISO/IEC JTC 1/SC 29/WG 11, JCTVC-Q1008_v1, Mar. 27-Apr. 4, 2014, 136 pages.

"Series H: Audiovisual and Multimedia Systems, Infrastructure of audiovisual services—Coding of moving video", ITU-T Telecommunication Standardization Sector of ITU, Recommendation H.265, Apr. 2013, 315 pages.

* cited by examiner

| chroma_format_idc | Chroma a format | Sub Width C | Sub Height C |
|---|---|---|---|
| 0 | monochrome | 1 | 1 |
| 1 | 4:2:0 | 2 | 2 |
| 2 | 4:2:2 | 2 | 1 |
| 3 | 4:4:4 | 1 | 1 |

FIG. 8
(a)
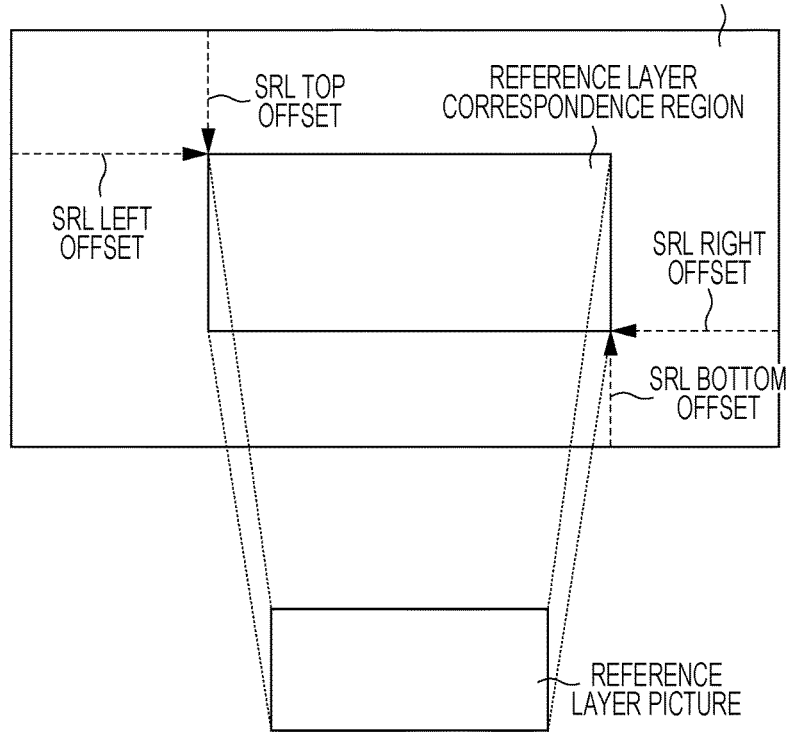
(b)
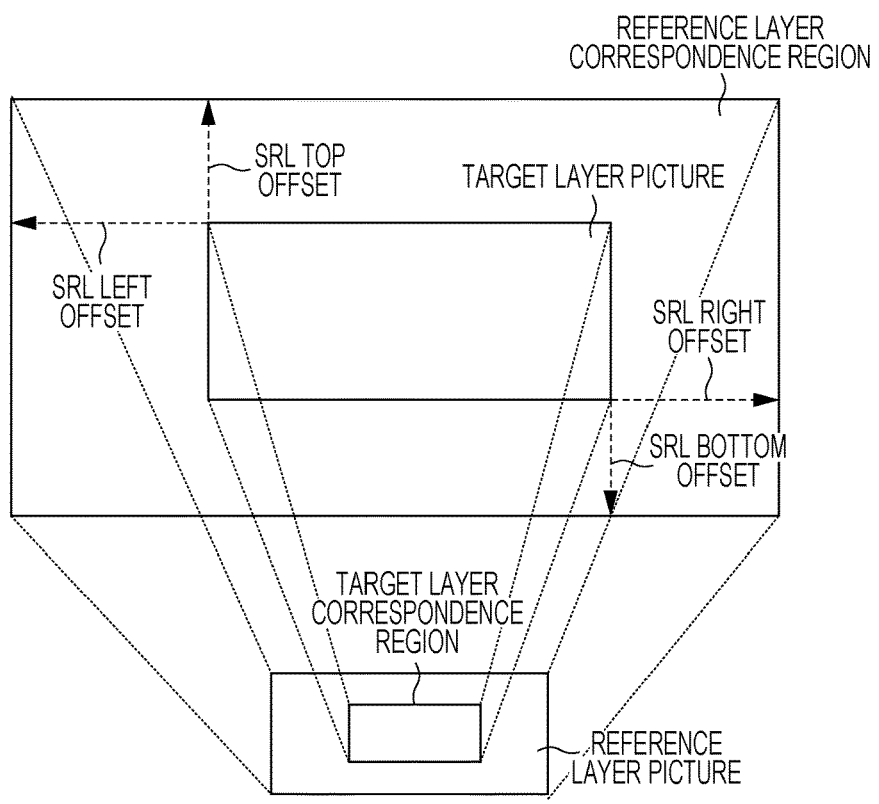

FIG. 9

| sps_extension(){ | Descriptor |
|---|---|
| ... | |
| num_scaled_ref_layer_offsets | ue(v) |
| for(i = 0: i < num_scaled_ref_layer_offsets; i++){ | |
|    scaled_ref_layer_id[i] | u(σ) |
|    scaled_ref_layer_left_offset[scaled_ref_layer_id[i]] | se(v) |
|    scaled_ref_layer_top_offset[scaled_ref_layer_id[i]] | se(v) |
|    scaled_ref_layer_right_offset[scaled_ref_layer_id[i]] | se(v) |
|    scaled_ref_layer_bottom_offset[scaled_ref_layer_id[i]] | se(v) |
| } | |
| ... | |
| } | |

FIG. 10

| sps_extension(){ | Descriptor |
|---|---|
| ... | |
| num_ref_layer_offsets | ue(v) |
| for(i = 0: i < num_ref_layer_offsets; i++){ | |
|    ref_layer_id[i] | u(σ) |
|    ref_layer_left_offset[ref_layer_id[i]] | se(v) |
|    ref_layer_top_offset[ref_layer_id[i]] | se(v) |
|    ref_layer_right_offset[ref_layer_id[i]] | se(v) |
|    ref_layer_bottom_offset[ref_layer_id[i]] | se(v) |
| } | |
| ... | |
| } | |

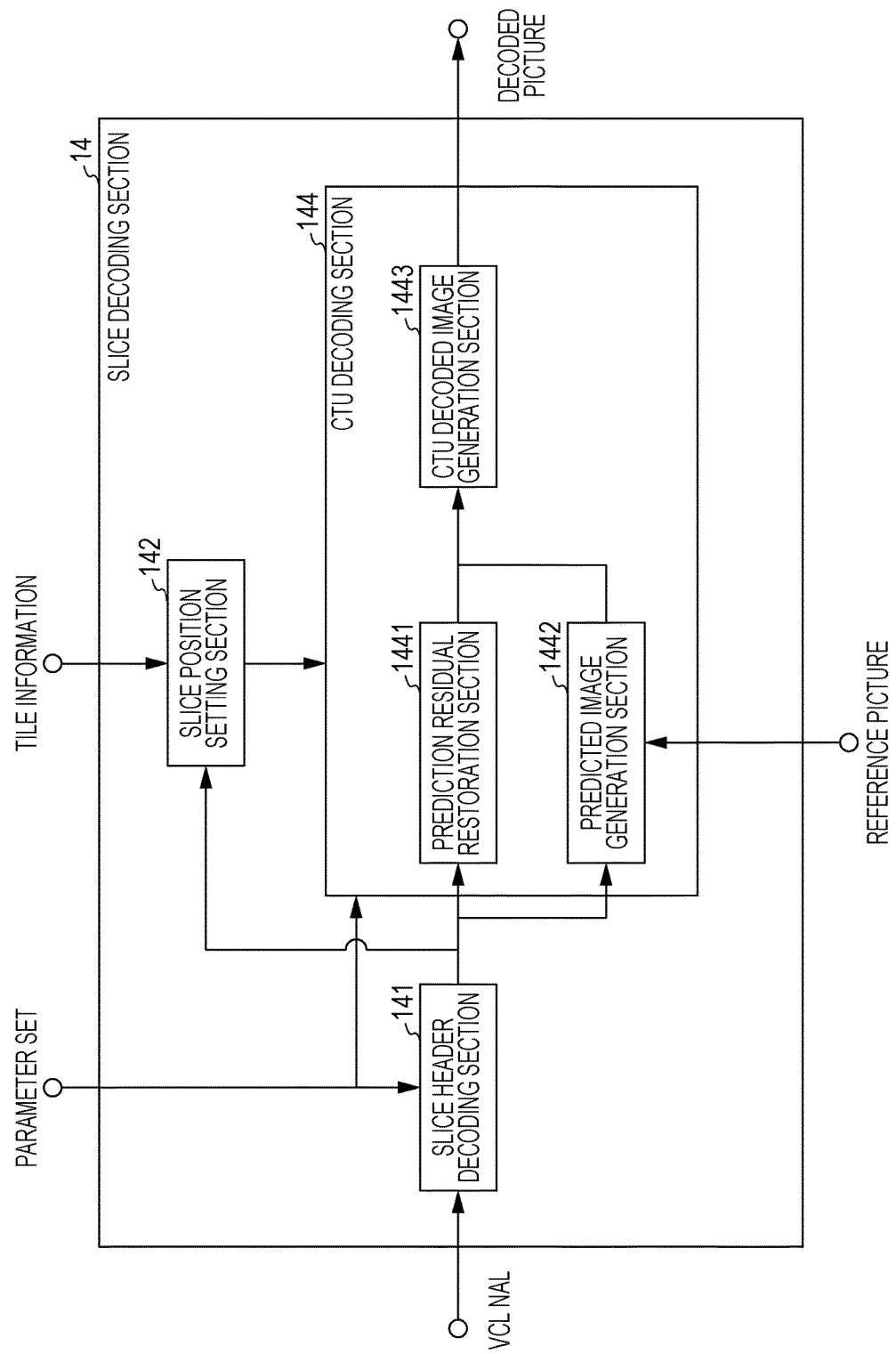

IMAGE DECODING DEVICE AND IMAGE CODING DEVICE

TECHNICAL FIELD

The present invention relates to an image decoding device decoding hierarchically coded data obtained by hierarchically coding an image and an image coding device generating hierarchically coded data by hierarchically coding an image.

BACKGROUND ART

As one piece of information transmitted with a communication system or information recorded in an accumulation device, there is an image or a moving image. In the related art, technologies for coding images are known to transmit and accumulate such images (hereafter including moving images).

As a moving image coding scheme, AVC (H.264/MPEG-4 Advanced Video Coding) and High-Efficiency Video Coding (HEVC), which is a succession codec, are known (see NPL 1).

In such a moving image coding scheme, normally, a predicted image is generated based on a local decoded image obtained by coding/decoding an input image, and a predicted residual obtained by subtracting the predicted image from an input image (original image) is coded. An inter-frame prediction (inter-prediction) and intra-frame prediction (intra-prediction) are exemplified as a method of generating a predicted image.

In intra-prediction, predicted images are sequentially generated in a picture based on a local decoded image in the same picture.

In inter-prediction, a predicted image is generated through inter-picture motion compensation. The decoded picture used to generate a predicted image through inter-prediction is referred to as a reference picture.

There are also known technologies for generating coded data from a plurality of moving images by dividing and coding the plurality of mutually relevant moving images into layers (hierarchies) and these technologies are referred to as hierarchical coding technologies. Coded data generated by the hierarchical coding technologies is also referred to as hierarchical coded data.

As a representative hierarchical coding technology, scalable HEVC (SHVC) based on HEVC is known (see NPL 2).

In SHVC, spatial scalability, temporal scalability, and SNR scalability are supported. For example, in the case of the spatial scalability, moving images with a plurality of different resolutions are divided into layers to be coded to generate hierarchical coded data. For example, an image obtained to have a desired resolution by performing down-sampling on an original image is coded as a lower layer. Next, inter-layer prediction is applied to remove redundancy between the layers, and then the original image is coded as a higher layer.

As another representative hierarchical coding technology, multi view HEVC (MV-HEVC) which is based on HEVC is known. MV-HEVC supports view scalability. In the view scalability, moving images corresponding to a plurality of different viewpoints (views) are divided into layers to be coded to generate hierarchical coded data. For example, a moving image corresponding to a viewpoint serving as a base (base view) is coded as a lower layer. Next, inter-layer prediction is applied, and then moving images corresponding to different viewpoints are coded as higher layers.

As inter-layer prediction of SHVC and MV-HEVC, there are inter-layer image prediction and inter-layer motion prediction. In the inter-layer image prediction, a predicted image is generated using a decoded image of a lower layer. In the inter-layer motion prediction, a prediction value of motion information is derived using motion information of a lower layer. A picture used for prediction in the inter-layer prediction is referred to as an inter-layer reference picture. A layer including the inter-layer reference picture is referred to as a reference layer. Hereinafter, a reference picture used for inter-prediction and a reference picture used for inter-layer prediction are simply collectively referred to as a reference picture.

The inter-layer image prediction includes a reference pixel position derivation process of deriving a pixel position on a lower layer which corresponds to the position of a prediction target pixel on a higher layer and a scale derivation process of deriving a scale corresponding to a magnification ratio in a scaling process applied to a picture of a lower layer.

In SHVC and MV-HEVC, any of inter-prediction, intra-prediction, and inter-layer image prediction can be used to generate a predicted image.

As one application using SHVC and MV-HEVC, there is a video application considering a region of interest. For example, a video reproduction terminal normally reproduces a video of an entire region at a relatively low resolution. In a case in which a part of a displayed video is designated as a region of interest by a viewer of a video reproduction terminal, the region of interest is displayed at a high resolution on the reproduction terminal.

A video application considering the foregoing region of interest can be realized using a hierarchical coded data in which a video with a relative low resolution of an entire region is coded as coded data of a lower layer and a video with a high resolution of a region of interest is coded as coded data of a higher layer. That is, in a case in which an entire region is reproduced, only coded data of the lower layer is decoded and reproduced. In a case in which a video with a high resolution of a region of interest is reproduced, coded data of a higher layer is added to the coded data of the lower layer to be transmitted. In this way, it is possible to realize the application in a transmission band less than that in a case in which both of coded data for a low-resolution video and coded data for a high-resolution video are transmitted. At this time, by extracting the coded data corresponding to a region including the region of interest from each of the higher layer and the lower layer and transmitting the coded data, it is possible to further suppress a transmission band.

In the foregoing video application considering a region of interest, a positional relation between pixels of the higher layer and pixels of the lower layer is changed in a case in which the coded data of the higher layer and the lower layer including the region of interest is generated. As a result, there is a problem in that prediction accuracy deteriorates in a case in which a pixel value of the higher layer is predicted based on a pixel value of the lower layer.

In SHVC (see NPL 2), a scaled reference layer offset is adopted as a parameter indicating a positional relation between pixels of a higher layer and pixels of a lower layer. The scaled reference layer offset is a set of offsets indicating the position of a predetermined region on a reference layer (for example, an entire reference layer picture) on a higher layer which is a target layer.

NPL 3 discloses a method of realizing matching between reference pixel positions (correspondence reference positions) or before and after extraction of a scale by transmitting a reference layer offset indicating the position of a region used for scale calculation on a lower layer in addition to the above-described scaled reference layer offset and by calculating a reference pixel position or a scale using the scaled reference layer offset and the reference layer offset even in a case in which partial data corresponding to a region of interest is extracted from hierarchical coded data.

CITATION LIST

Non Patent Literature

NPL 1: "Recommendation H.265 (04/13)", ITU-T (disclosed on Jun. 7, 2013).
NPL 2: JCTVC-Q1008_v1 "Preliminary version of High efficiency video coding (HEVC) scalable extension Draft 6", Joint Collaborative Team on Video Coding (JCT-VC) of ITU-T SG 16 WP 3 and ISO/IEC JTC 1/SC 29/WG 11 17th Meeting: Valencia, ES, 27 Mar. to 4 Apr. 2014 (disclosed on Apr. 15, 2014).
NPL 3: JCTVC-Q0159 "AHG 13: Sub-region extraction-position calculation and comparison of different approaches", Joint Collaborative Team on Video Coding (JCT-VC) of ITU-T SG 16 WP 3 and ISO/IEC JTC1/SC 29/WG 11 17th Meeting: Valencia, ES, 27 Mar. to 4 Apr. 2014 (disclosed on Mar. 18, 2014).

SUMMARY OF INVENTION

Technical Problem

However, in the scaled reference layer offset and the reference layer offset disclosed in NPL 2 and NPL 3, there is a problem in that a correct value may not be set in a case in which the color format of a picture of a higher layer or a lower layer has a corresponding relation between a luminance pixel and a chroma pixel which is different from the 4:2:0 color format. Therefore, a reference pixel position or a scale derived from the scaled reference layer offset and the reference layer offset is different from an actual value in some cases. Accordingly, there is a problem in that a predicted image generated through inter-layer prediction is inaccurate, and consequently a prediction residual increases and a code amount of coded data thus increases.

The present invention is devised in view of the foregoing problems and an object of the present invention is to realize an image coding device and an image decoding device capable of setting an accurate value in a scaled reference layer offset or a reference layer offset in a case in which a picture with a different color format from a 4:2:0 color format is a processing target of a higher layer or a lower layer, without increasing a code amount of the scaled reference layer offset or the reference layer offset coded or decoded in a case in which a picture with a 4:2:0 color format is a processing target.

Solution to Problem

In order to resolve the foregoing problems, an image decoding device according to the present invention decodes coded data that is hierarchically coded to restore a decoded picture of a higher layer which is a target layer. The image decoding device includes: a parameter set decoding section that decodes a parameter set; and a predicted image generation section that generates a predicted image by inter-layer prediction with reference to decoded pixels of a reference layer picture. The parameter set decoding section decodes a color format of a target layer picture and derives a luminance chroma size ratio of a target layer picture based on the color format. The parameter set decoding section decodes a scaled reference layer offset syntax which is coded in a chroma pixel unit of the target layer. The predicted image generation section derives a scaled reference layer offset by a product of a value of the scaled reference layer offset syntax and the luminance chroma size ratio of the target layer picture, calculates a scale based on the scaled reference layer offset, derives a correspondence reference position with reference to the scale, and performs the inter-layer prediction.

In order to resolve the foregoing problems, an image coding device according to the present invention generates coded data of a higher layer which is a target layer from an input image. The image coding device includes: a parameter set coding section that codes a parameter set; and a predicted image generation section that generates a predicted image by inter-layer prediction with reference to decoded pixels of a reference layer picture. The parameter set coding section codes a color format of a target layer picture and derives a luminance chroma size ratio of the target layer picture based on the color format. The parameter set coding section codes a scaled reference layer offset syntax in a chroma pixel unit of the target layer. The predicted image generation section derives a scaled reference layer offset by a product of a value of the scaled reference layer offset syntax and the luminance chroma size ratio of the target layer picture, calculates a scale based on the scaled reference layer offset, derives a correspondence reference position with reference to the scale, and performs the inter-layer prediction.

Advantageous Effects of Invention

The image decoding device (image coding device) according to the present invention includes the parameter set decoding section (coding section) that decodes a parameter set and a predicted image generation section that generates a predicted image through inter-layer prediction with reference to decoded pixels of a reference layer picture. The parameter set decoding section (coding section) decodes (codes) a scaled reference layer offset syntax in a chroma pixel unit. The predicted image generation section derives a scaled reference layer offset by a product of a value of the scaled reference layer offset syntax and the luminance chroma size ratio of the target layer, calculates a scale based on the scaled reference layer offset, derives a correspondence reference position with reference to the scale, and performs the inter-layer prediction.

Accordingly, in a case in which the color format of the target picture is 4:2:0 or 4:2:2, the value of the reference layer offset syntax can be decoded (coded) with a code with a less code amount than in a case in which the reference layer offset syntax is decoded in the luminance pixel unit. Further, in a case in which the color format of the reference picture is 4:4:4, the reference layer offset syntax can be decoded (coded) with higher precision, that is, with luminance one-pixel precision, more than in a case in which the reference layer offset syntax is decoded in a luminance two-pixel unit.

BRIEF DESCRIPTION OF DRAWINGS

FIG. 2(a) illustrates the side of a hierarchical moving image coding device, and FIG. 2(b) illustrates the side of the hierarchical moving image decoding device.

FIG. 3(a) illustrates a sequence layer that defines a sequence SEQ, FIG. 3(b) illustrates a picture layer that defines a picture PICT, FIG. 3(c) illustrates a slice layer that defines a slice S, FIG. 3(d) illustrates a CTU layer that defines a coding tree unit CTU, and FIG. 3(e) illustrates a CU layer that defines a coding unit (CU) included in the coding tree unit CTU.

FIG. 8 is a diagram exemplifying a relation among a target layer picture, a target layer correspondence region, a reference layer picture, a reference layer correspondence region, and a scaled reference layer offset.

FIG. 9 is a diagram illustrating a part of a syntax table referred to at the time of decoding SPS extension and a portion related to a syntax related to scaled reference layer offset information.

FIG. 10 is a diagram illustrating a part of a syntax table referred to at the time of decoding SPS extension and a portion related to a syntax related to reference layer offset information.

FIG. 11 is a functional block diagram illustrating the configuration of a slice decoding section included in the hierarchical moving image decoding device.

FIG. 14(a) illustrates the transmission apparatus on which the hierarchical moving image coding device is mounted, and FIG. 14(b) illustrates the reception apparatus on which the hierarchical moving image decoding device is mounted.

FIG. 15(a) illustrates the recording apparatus on which the hierarchical moving image coding device is mounted, and FIG. 15(b) illustrates the reproduction apparatus on which the hierarchical moving image decoding device is mounted.

DESCRIPTION OF EMBODIMENTS

A hierarchical moving image decoding device 1 and a hierarchical moving image coding device 2 according to an embodiment of the present invention will be described below with reference to FIGS. 1 to 15.

[Overview]

A hierarchical moving image decoding device (image decoding device) 1 according to the embodiment decodes coded data subjected to hierarchical coding by a hierarchical moving image coding device (image coding device) 2. Hierarchical coding refers to a coding scheme of hierarchically coding a moving image with low quality to a moving image having high quality. Hierarchical coding is standardized in, for example, SVC or SHVC. The quality of a moving image mentioned herein broadly means an element that influences on a moving image volume subjectively and objectively. The quality of a moving image includes, for example, a "resolution", a "frame rate", "image quality", and "pixel expression precision". Accordingly, a difference in the quality of a moving image refers to difference in, for example, "resolution" and the like, but the present invention is not limited thereto. For example, even in the case of moving images quantized in different quantization steps (that is, the case of moving images coded with different coding noise), the quality of a moving images can be said to be mutually different.

From the viewpoint of kinds of hierarchized information, hierarchy coding technologies are also sometimes classified into (1) spatial scalability, (2) temporal scalability, (3) signal-to-noise ratio (SNR) scalability, and (4) view scalability. Spatial scalability refers to a technology for performing hierarchization in regard to the resolution or the size of an image. Temporal scalability refers to a technology for performing hierarchization in regard to a frame rate (the number of frames per unit time). SNR scalability refers to a technology for performing hierarchization in regard to coding noise. The view scalability refers to a technology for performing hierarchization in regard to a viewpoint position associated with each image.

Before the hierarchical moving image coding device 2 and the hierarchical moving image decoding device 1 according to the embodiment are described in detail, (1) a layer structure of hierarchically coded data generated by the hierarchical moving image coding device 2 and decoded by the hierarchical moving image decoding device 1 will be described first, and (2) a specific example of a data structure adopted in each layer will be described subsequently.

[Layer Structure of Hierarchically Coded Data]

Figure 2:
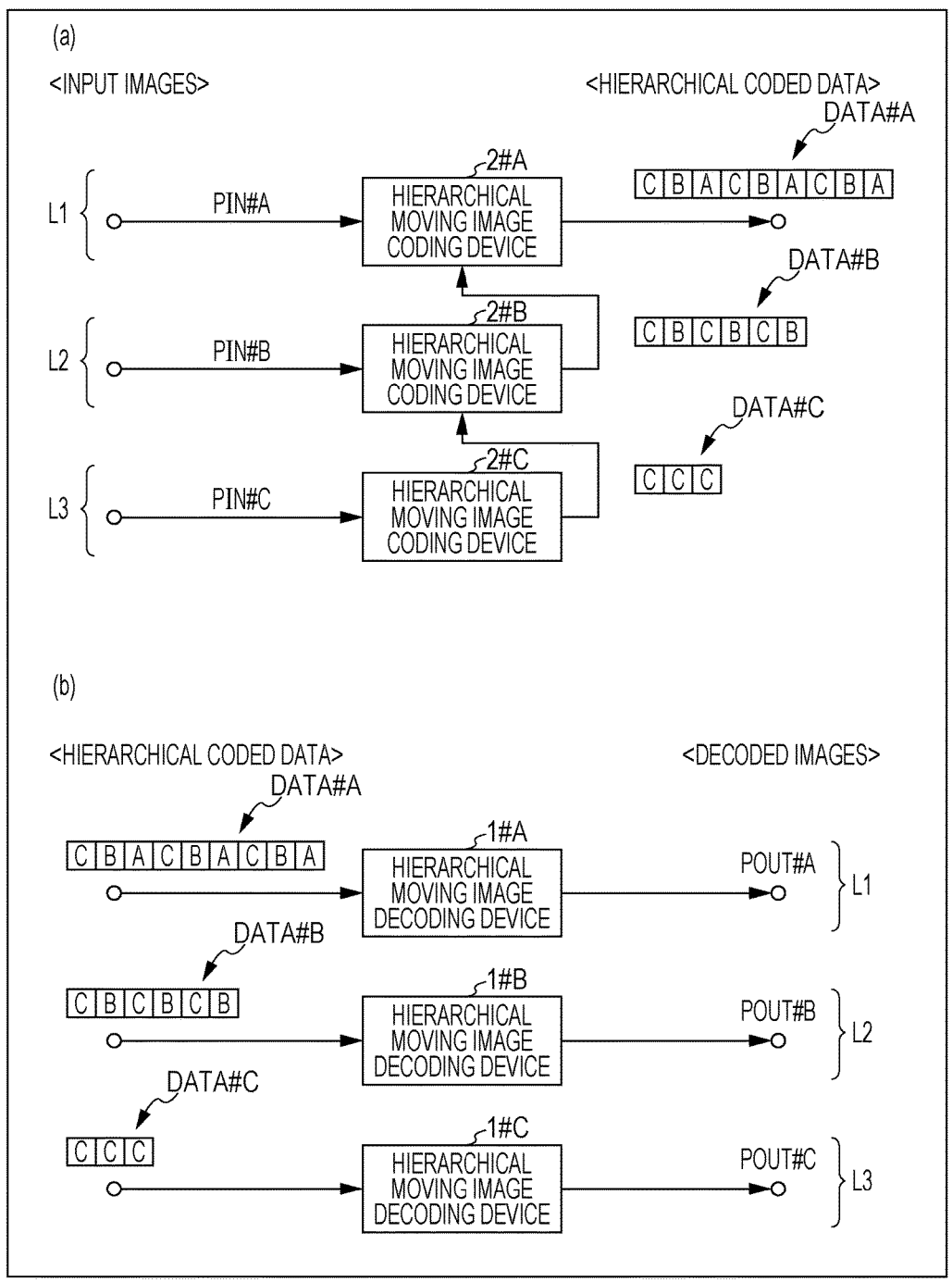
FIG. 2 is a diagram for describing the layer structure of hierarchically coded data according to the embodiment of the present invention.

Here, coding and decoding of hierarchically coded data will be described below with reference to FIG. 2. FIG. 2 is a diagram schematically illustrating a case in which a moving image is hierarchically coded/decoded in three layers, a lower layer L3, an intermediate layer L2, and a higher layer L1. That is, in examples illustrated in (a) and FIG. 2(b), the higher layer L1 is the highest layer and the lower layer L3 is the lowest layer among the three layers.

Hereinafter, a decoded image corresponding to specific quality which can be decoded from hierarchically coded data is referred to as a decoded image of a specific layer (or a coded image corresponding to a specific layer) (for example, a decoded image POUT#A of the higher layer L1).

FIG. 2(a) illustrates hierarchical moving image coding devices 2#A to 2#C that hierarchically code input images PIN#A to PIN#C to generate pieces of coded data DATA#A to DATA#C, respectively. FIG. 2(b) illustrates hierarchical moving image decoding devices 1#A to 1#C that decode the pieces of coded data DATA#A to DATA#C hierarchically coded to generate decoded images POUT#A to POUT#C, respectively.

First, the coding device side will be described with reference to FIG. 2(a). The input images PIN#A, PIN#B, PIN#C input to the coding device side are the same as original images, but have different qualities (resolution, a frame rate, image quality, and the like) from the original images. The quality of the images decreases in the order of the input images PIN#A, PIN#B, and PIN#C.

The hierarchical moving image coding device 2#C of the lower layer L3 codes the input image PIN#C of the lower layer L3 to generate the coded data DATA#C of the lower layer L3. The coded data DATA#C includes basic information necessary to decode the decoded image POUT#C of the lower layer L3 (which is indicated by "C" in FIG. 2). Since the lower layer L3 is the lowest layer, the coded data DATA#C of the lower layer L3 is referred to as basic coded data.

The hierarchical moving image coding device 2#B of the intermediate layer L2 codes the input image PIN#B of the intermediate layer L2 with reference to the coded data DATA#C of the lower layer to generate the coded data DATA#B of the intermediate layer L2. The coded data DATA#B of the intermediate layer L2 includes not only basic information "C" included in the coded data DATA#C but also additional information (which is indicated by "B" in FIG. 2) necessary to decode the decoded image POUT#B of the intermediate layer.

The hierarchical moving image coding device 2#A of the higher layer L1 codes the input image PIN#A of the higher layer L1 with reference to the coded data DATA#B of the intermediate layer L2 to generate the coded data DATA#A of the higher layer L1. The coded data DATA#A of the higher layer L1 includes not only the basic information "C" necessary to decode the decoded image POUT#C of the lower layer L3 and the additional information "B" necessary to decode the decoded image POUT#B of the intermediate layer L2 but also additional information (which is indicated by "A" in FIG. 2) necessary to decode the decoded image POUT#A of the higher layer.

Thus, the coded data DATA#A of the higher layer L1 includes information regarding the decoded images having a plurality of different qualities.

Next, the decoding device side will be described with reference to FIG. 2(b). On the decoding device side, the decoding devices 1#A, 1#B, and 1#C according to the layers, the higher layer L1, the intermediate layer L2, and the lower layer L3, decode the coded data DATA#A, DATA#B, and DATA#C and output the decoded images POUT#A, POUT#B, and POUT#C, respectively.

A moving image having specific quality can also be reproduced by extracting information regarding a part of upper hierarchically coded data and decoding the extracted information in a specific lower decoding device.

For example, the hierarchical decoding device 1#B of the intermediate layer L2 may extract information (that is, "B" and "C" included in the hierarchically coded data DATA#A) necessary to decode the decoded image POUT#B from the hierarchically coded data DATA#A of the higher layer L1 and decode the decoded image POUT#B. In other words, on the decoding device side, the decoded images POUT#A, POUT#B, and POUT#C can be decoded based on the information included in the hierarchically coded data DATA#A of the higher layer L1.

The present invention is not limited to the foregoing hierarchically coded data of the three layers. The hierarchically coded data may be coded hierarchically in two layers or may be coded hierarchically in a number of layers greater than three layers.

Some or all of the pieces of coded data regarding the decoded image of a specific layer may be coded independently from the other layers, and the hierarchically coded data may be configured so that the information of the other layers is not referred to at the time of the decoding of the specific layer. For example, in the example described above with reference to FIGS. 2(a) and 2(b), it has been described that "C" and "B" are referred to in the decoding of the decoded image POUT#B, but the present invention is not limited thereto. The hierarchically coded data may be configured such that the decoded image POUT#B can be decoded using only "B". For example, a hierarchical moving image decoding device can be configured such that the hierarchical coded data formed from "B" and the decoded image POUT#C are used as inputs to decode the decoded image POUT#B.

In a case in which the SNR scalability is realized, the hierarchically coded data can be generated so that the same original image is used as the input images PIN#A, PIN#B, and PIN#C, and subsequently the decoded images POUT#A, POUT#B, and POUT#C have different image qualities. In this case, the hierarchical moving image coding device of the lower layer generates the hierarchically coded data by quantizing a prediction residual by using a larger quantization width than in the hierarchical moving image coding device of the higher layer.

In the present specification, the following terms will be defined to facilitate the description. The following terms are used to describe the following technical factors unless otherwise mentioned.

Higher layer: A layer located to be higher than a certain layer is referred to as a higher layer. For example, higher layers of the lower layer L3 in FIG. 2 are the intermediate layer L2 and the higher layer L1. A decoded image of a higher layer refers to a decoded image having higher quality (for example, higher resolution, a higher frame rate, or higher image quality).

Lower layer: A layer located lower than a certain layer is referred to as a lower layer. For example, lower layers of the higher layer L1 in FIG. 2 are the intermediate layer L2 and the lower layer L3. A decoded image of a lower layer refers to a decoded image having lower quality.

Target layer: A target layer refers to a layer which is a decoding or coding target. A decoded image corresponding to the target layer is referred to as a target layer picture. A pixel that forms the target layer picture is referred to as a target layer pixel.

Reference layer: A specific lower layer referred to at the time of decoding a decoded image corresponding to the target layer is referred to as a reference layer. A decoded image corresponding to the reference layer is referred to as a reference layer picture. A pixel that forms the reference layer is referred to as a reference layer pixel.

In the example illustrated in FIGS. 2(a) and (b), reference layers of the higher layer L1 are the intermediate layer L2 and the lower layer L3. However, the present invention is not limited thereto, but the hierarchically coded data can also be configured such that none of the lower layers are referred to at the time of decoding the specific layer. For example, the hierarchically coded data can also be configured so that the reference layer of the higher layer L1 is one of the intermediate layer L2 and the lower layer L3.

Base layer: A layer located lowest is referred to as a base layer. A decoded image of the base layer is a decoded image having the lowest quality which can be decoded from the coded data and is referred to as a base decoded image. In other words, the base decoded image is a decoded image corresponding to the lowest layer. Partially coded data of the hierarchically coded data necessary to decode the base decoded image is referred to as base coded data. For example, the basic information "C" included in the hierarchically coded data DATA#A of the higher layer L1 is the base coded data.

Enhancement layer: A layer higher than the base layer is referred to as an enhancement layer.

Layer identifier: A layer identifier is used to identify a layer and has a one-to-one correspondence relation with a layer. The hierarchically coded data includes a hierarchical identifier used to select the partially coded data necessary to decode the decoded image of a specific layer. A subset of the hierarchically coded data associated with the layer identifier corresponding to a specific layer is referred to as a layer notation.

In general, at the time of decoding the decoded image of a specific layer, the layer notation of the specific layer and/or the layer notation corresponding to a lower layer of the specific layer can be used. That is, at the time of decoding the decoded image of a target layer, the layer notation of the target layer and/or the layer notation of one or more layers included in the lower layer of the target layer can be used.

Inter-layer prediction: Inter-layer prediction is prediction in which syntax element values of the target layer, coding parameters used to decode the target layer, or the like are predicted based on syntax element values included in the layer notation of a layer (reference layer) that are different from the layer notation of the target layer, values derived from the syntax element values, and the decoded image. Inter-layer prediction in which information regarding motion prediction is predicted from information regarding the reference layer is also sometimes referred to as motion information prediction. Inter-layer prediction in which prediction is performed from the decoded image of the lower layer is also sometimes referred to as inter-layer image prediction (or inter-layer texture prediction). A layer used for the inter-layer prediction is, for example, a lower layer of the target layer. Prediction performed in the target layer without using the reference layer is also sometimes referred to as intra-layer prediction.

The foregoing terms are terms merely used to facilitate the description, and the foregoing technical factors may be expressed by other terms.

[Data Structure of Hierarchically Coded Data]

Hereinafter, a case in which HEVC and an extension scheme of HEVC are used as coding schemes of generating coded data of each layer will be exemplified. However, the present invention is not limited thereto, but the coded data of each layer may be generated by a coding scheme such as MPEG-2 or H.264/AVC.

The lower layer and the higher layer may be coded according to different coding schemes. The coded data of each layer may be supplied to the hierarchical moving image decoding device 1 via mutually different transmission paths or may be supplied to the hierarchical moving image decoding device 1 via the same transmission path.

For example, in a case in which an ultra-high resolution image (a moving image or 4K video data) is subjected to scalable coding in the base layer and one enhancement layer to be transmitted, video data obtained by performing downscaling and interlacing on the 4K video data may be coded in conformity to MPEG-2 or H.264/AVC and transmitted in the base layer via a television broadcast network, and a 4K video (progressive) may be coded by HEVC and transmitted in the enhancement layer via the Internet.

(Base Layer)

Figure 3:
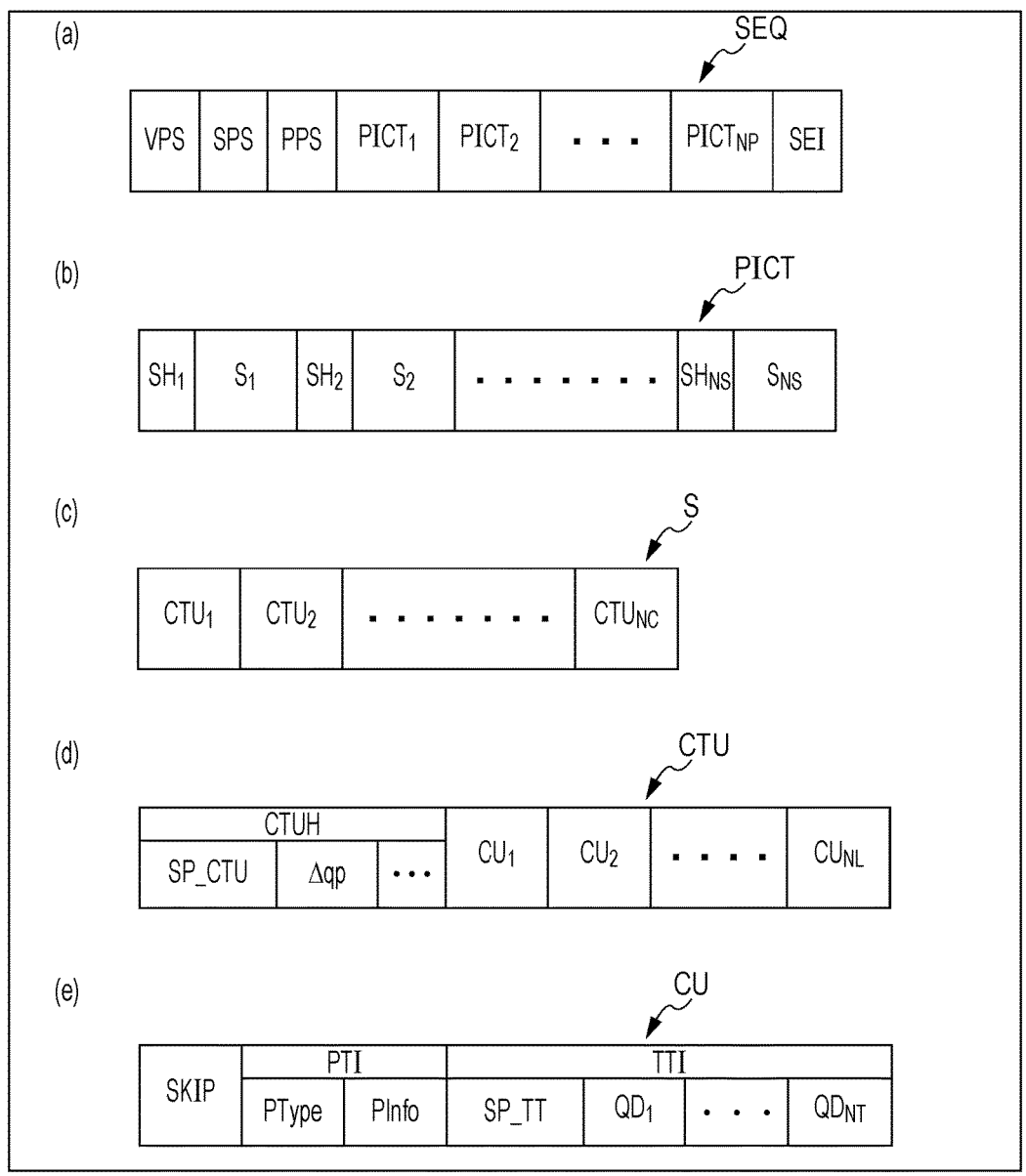
FIG. 3 is a diagram for describing the structure of the hierarchically coded data according to the embodiment of the present invention.

FIG. 3 is a diagram exemplifying the data structure of the coded data (the hierarchically coded data DATA#C in the example of FIG. 2) which can be adopted in the base layer. The hierarchically coded data DATA#C includes, for example, a sequence and a plurality of pictures included in the sequence.

The hierarchical structure of the data in the hierarchically coded data DATA#C is illustrated in FIG. 3. FIGS. 3(a) to 3(e) are diagrams illustrating a sequence layer that defines a sequence SEQ, a picture layer that defines a picture PICT, a slice layer that defines a slice S, a CTU layer that defines a coding tree unit (CTU), and a coding unit (CU) layer that defines a CU included in the coding tree unit CTU, respectively.

(Sequence Layer)

In the sequence layer, a set of data referred to by the hierarchical moving image decoding device 1 is defined to decode a processing target sequence SEQ (hereinafter also referred to as a target sequence). As illustrated in FIG. 3(a), the sequence SEQ includes a video parameter set VPS, a sequence parameter set SPS, a picture parameter set PPS, pictures PICT1 to PICTNP (where NP is a total number of pictures included in the sequence SEQ), and supplemental enhancement information SEI.

In the video parameter set VPS, the number of layers included in the coded data and a dependence relation between the layers are defined.

In the sequence parameter set SPS, a set of coding parameters referred to by the hierarchical moving image decoding device 1 is defined to decode the target sequence of the target layer. There may be the plurality of SPSs in the coded data. In this case, the SPS used for the decoding for each target sequence of the target layer is selected from a plurality of candidates. The SPS used to decode a specific sequence is also referred to as an active SPS. Hereinafter, the SPS means the active SPS for the target sequence of the target layer, unless otherwise mentioned.

In the picture parameter set PPS, a set of coding parameters referred to by the hierarchical moving image decoding device 1 is defined to decode each picture in the target sequence. There may be the plurality of PPSs in the coded data. In this case, one of the plurality of PPSs is selected from the pictures in the target sequence. The PPS used to decode a specific picture is also referred to as an active PPS. Hereinafter, the PPS means the active PPS for the target picture, unless otherwise mentioned. The active SPS and the active PPS may be set to a different SPS or PPS for each layer.

(Picture Layer)

In the picture layer, a set of data referred to by the hierarchical moving image decoding device 1 is defined to decode the processing target picture PICT (hereafter also referred to as a target picture). As illustrated in FIG. 3(b), the picture PICT includes slice headers SH1 to SHNS and a plurality of slices, that is, slices S1 to SNS (where NS is a total number of slices included in the picture PICT).

In a case in which it is not necessary to distinguish the slice headers SH1 to SHNS or the slices S1 to SNS from each other, the slices are sometimes described below by omitting the subscripts of the codes. The same also applies to data which is data included in the hierarchically coded data DATA#C to be described below and is other data to which subscripts are appended.

A slice header SHk includes a coding parameter group referred to by the hierarchical moving image decoding device 1 to decide a method of decoding a corresponding slice Sk. For example, an SPS identifier (seq_parameter_set_id) designating the SPS or a PPS identifier (pic_parameter_set_id) designating the PPS are included. Further, slice type designation information (slice_type) designating the type of slice is an example of the coding parameter included in the slice header SH.

Examples of the types of slices which can be designated by the slice type designation information include (1) an I slice using only intra-prediction at the time of coding, (2) a P slice using unidirectional prediction or intra-prediction at the time of coding, and (3) a B slice using unidirectional prediction, bidirectional prediction, or intra-prediction at the time of coding can be exemplified.

(Slice Layer)

In the slice layer, a set of data referred to by the hierarchical moving image decoding device 1 is defined to decode the processing target slice S (also referred to as a target slice). As illustrated in FIG. 3(c), the slice S includes a sequence of coding tree blocks CTU1 to CTUNC (where NC is a total number of CTUs included in the slice S).

(CTU Layer)

In the CTU layer, a set of data referred to by the hierarchical moving image decoding device 1 is defined to decode the coding tree unit CTU (hereinafter also referred to as a target CTU) of the processing target. Further, the coding tree unit is also sometimes referred to as a coding tree block (CTB) or a largest cording unit (LCU).

The coding tree unit CTU includes a CTU header CTUH and pieces of coding unit information $CU_1$ to $CU_{NL}$ (where NL is a total number of pieces of coding unit information included in the CTU). Here, a relation between the coding tree unit CTU and the coding unit information CU will be described as follows.

The coding tree unit CTU is split into units for specifying block sizes to perform the intra-prediction or the inter-prediction and each process for transform.

The units of the coding tree unit CTU are split through recursive quadtree splitting. Hereinafter, a tree structure obtained through the recursive quadtree splitting is referred to as a coding tree.

Hereinafter, a unit corresponding to a leaf which is an end node of the coding tree is referred as a coding node. Further, since the coding node is a basic unit of a coding process, the coding node is also referred to as a coding unit (CU).

That is, the coding unit information (hereinafter referred to as CU information) CU1 to CUNL is information corresponding to each coding node (coding unit) obtained by performing the recursive quadtree splitting on the coding tree unit CTU.

A root of a coding tree matches the coding tree unit CTU. In other words, the coding tree unit CTU matches a highest node of a tree structure of quadtree splitting that includes a plurality of coding nodes recursively.

Each coding node has a size of half of the horizontal and vertical sizes of a coding node (that is, a node located in the immediately higher layer of the coding node) which is a master node of the coding node.

The size of the coding tree unit CTU and the size of each coding unit depend on size designation information of the minimum coding node included in the sequence parameter set SPS and a difference in a hierarchy depth between the maximum coding node and the minimum coding node. For example, in a case in which the size of the minimum coding node is 8×8 pixels and the difference in the hierarchy depth between the maximum coding node and the minimum coding node is 3, the size of the coding tree unit CTU is 64×64 pixels and the size of the coding node can be any of four sizes, that is, 64×64 pixels, 32×32 pixels, 16×16 pixels, and 8×8 pixels.

(CTU Header)

The CTU header CTUH includes coding parameters referred to by the hierarchical moving image decoding device 1 to decide a method of decoding a target CTU. Specifically, as illustrated in FIG. 3(d), the CTU header CTUH includes a CTU splitting information SP_CTU designating a splitting pattern of the target CTU into each CU, and a quantization parameter difference Δqp (qp_delta) designating the magnitude of a quantization step.

The CTU splitting information SP_CTU is information indicating a coding tree for splitting the CTU and is specifically information for designating the shape, and the size of each CU included in the target CTU and the position of each CU in the target CTU.

The CTU splitting information SP_CTU may not explicitly include the shape or the size of the CU. For example, the CTU splitting information SP_CTU may be a set of flags indicating whether the entire target CTU or a partial region of the CTU is subjected to quad-splitting. In this case, the shape and the size of each CU can be specified by using the shape and the size of the CTU together.

(CU Layer)

In the CU layer, a set of data referred to by the hierarchical moving image decoding device 1 is defined to decode a processing target CU (hereinafter also referred to as a target CU).

Here, a tree structure of data included in the CU will be described before the specific contents of the data included in the CU information CU is described. A coding node is a node of the roots of a prediction tree (PT) and a transform tree (TT). The prediction tree and the transform tree will be described as follows.

In the prediction tree, the coding node is split into one prediction block or a plurality of prediction blocks, and the position and size of each prediction block are defined. In other words, the prediction block is one region or a plurality of non-overlapping regions included in the coding node. The prediction tree includes one prediction block or a plurality of prediction block obtained through the above-described splitting.

A prediction process is performed for each prediction block. Hereinafter, the prediction block which is a unit of prediction is also referred to as a prediction unit (PU).

Roughly speaking, the types of splitting (hereinafter abbreviated as PU splitting) in the prediction tree are two types of a case of intra-prediction and a case of inter-prediction.

In the case of the intra-prediction, as splitting methods, there are 2N×2N (the same size as the coding node) and N×N. In the case of the inter-prediction, as splitting methods, there are 2N×2N (the same size as the coding node), 2N×N, 2N×nU, 2N×nD, N×2N, nL×2N, and nR×2N.

In the transform tree, the coding node is split into one transform block or a plurality of transform blocks, and the position and size of each transform block are defined. In other words, the transform block is one region or a plurality of non-overlapping regions included in the coding node. The transform tree includes one transform block or the plurality of transform blocks obtained through the above-described splitting.

As the splitting of the transform tree, there are splitting in which a region having the same size is allocated as the coding node as a transform block and splitting which is performed through the recursive quadtree splitting as in the splitting of the above-described tree block.

A transform process is performed for each transform block. Hereinafter, the transform block which is a unit of transform is also referred to as a transform unit (TU).

(Data Structure of CU Information)

Subsequently, specific content of the data included in the CU information CU will be described with reference to FIG. 3(e). As illustrated in FIG. 3(e), specifically, the CU information CU includes a skip flag SKIP, prediction tree information (hereinafter abbreviated as PT information) PTI, and transform tree information (hereinafter abbreviated as TT information) TTI.

The skip flag SKIP is a flag that indicates whether a skip mode is applied to the target PU. In a case in which the value of the skip flag SKIP is 1, that is, the skip mode is applied to the target CU, a part of the PT information PTI and the TT information TTI in the CU information CU are omitted. The skip flag SKIP is omitted in the I slice.

[PT Information]

The PT information PTI is information regarding prediction tree (hereinafter abbreviated as a PT) included in the CU. In other words, the PT information PTI is a set of information regarding one PU or a plurality of PUs included in the PT and is referred to when a predicted image is generated by the hierarchical moving image decoding device 1. As illustrated in FIG. 3(e), the PT information PTI includes prediction type information PType and prediction information PInfo.

The prediction type information PType is information for designating a method of generating a predicted image in regard to the target PU. In the base layer, the prediction type information PType is information for designating whether to use the intra-prediction or the inter-prediction.

The prediction information PInfo is prediction information used in the prediction method of designating the prediction type information PType. Intra-prediction information PP Intra is included in the case of the intra-prediction in the base layer. Further, in the case of the inter-prediction, inter-prediction information PP_Inter is included.

The inter-prediction information PP_Inter includes prediction information referred to when the hierarchical moving image decoding device 1 generates an inter-predicted image through the inter-prediction. More specifically, the inter-prediction information PP_Inter includes inter-PU splitting information for designating a splitting pattern of the target CU into each inter-PU and inter-prediction parameters (motion compensation parameters) in regard to each inter-PU. The inter-prediction parameters include, for example, a merge flag (merge_flag), a merge index (merge_idx), an estimated motion vector index (mvp_idx), a reference picture index (ref_idx), an inter-prediction flag (inter_pred_flag), and a motion vector difference (mvd).

The intra-prediction information PP_Intra includes coding parameters referred to when the hierarchical moving image decoding device 1 generates an intra-predicted image through the intra-prediction. More specifically, the intra-prediction information PP_Intra includes intra-PU splitting information for designating a splitting pattern of the target CU into each intra-PU and intra-prediction parameters in regard to each intra-PU. The intra-prediction parameters are parameters for designating an intra-prediction method (prediction mode) in regard to each intra-PU.

[TT Information]

The TT information TTI is information regarding the transform tree (hereinafter abbreviated as a TT) included in the CU. In other words, the TT information TTI is a set of information regarding one transform block or a plurality of transform blocks included in the TT and is referred to when the hierarchical moving image decoding device 1 decodes residual data.

As illustrated in FIG. 3(e), the TT information TTI includes TT splitting information SP_TT for designating a splitting pattern of the target CU into each transform block and quantization prediction residuals QD1 o QDNT (where NT is a total number of blocks included in the target CU).

Specifically, the TT splitting information SP_TT is information for deciding the shape of each transform block included in the target CU and the position of each transform block in the target CU. For example, the TT splitting information SP_TT can be realized by information (split_transform_unit_flag) indicating whether the splitting of the target node is performed and information (trafoDepth) indicating a depth of the splitting.

For example, when the size of the CU is 64×64, each transform block obtained through the splitting can have a size from 32×32 pixels to 4×4 pixels.

Each quantization prediction residual QD is coded data generated when the hierarchical moving image coding device 2 performs the following processes 1 to 3 on a target block which is a processing target transform block.

Process 1: A prediction residual obtained by subtracting a predicted image from a coding target image is subjected to frequency transform (for example, discrete cosine transform (DCT), discrete sine transform (DST), or the like).

Process 2: A transform coefficient obtained in the process 1 is quantized.

Process 3: The transform coefficient quantized in the process 2 is subjected to variable-length coding.

The above-described quantization parameter qp indicates the magnitude of a quantization step QP used when the hierarchical moving image coding device 2 quantizes the transform coefficient (QP=$2^{qp/6}$).

(PU Splitting Information)

As the types of PU splitting designated based on the PU splitting information, there are the following total of eight kinds of patterns when the size of the target CU is assumed to be 2N×2N pixels. That is, there are four symmetric splittings of 2N×2N pixels, 2N×N pixels, N×2N pixels, and N×N pixels and there are four asymmetric splittings of 2N×nU pixels, 2N×nD pixels, nL×2N pixels, and nR×2N pixels. Further, N=$2^m$ (where m is any integer equal to or greater than 1) is meant. Hereinafter, a prediction unit obtained by splitting the target CU is referred to as a prediction block or a partition.

(Enhancement Layer)

For example, a data structure which is the substantially the same as the data structure illustrated in FIG. 3 can also be adopted in regard to coded data included in the layer notation of the enhancement layer (hereinafter referred to as enhancement layer coded data). However, additional information may be added or omitted or parameters may be omitted in regard to the enhancement layer coded data, as will be described below.

In the slice layer, identification information (dependency_id, temporal_id, quality_id, and view_id) of layers of the spatial scalability, the temporal scalability, and the SNR scalability, and view scalability may be coded.

The prediction type information PType included in the CU information CU is information for designating one of the intra-prediction, the inter-prediction, and the inter-layer image prediction as the method of generating the predicted image in regard to the target CU. The prediction type information PType includes a flag (inter-layer image prediction flag) for designating whether to apply the inter-layer image prediction mode. The inter-layer image prediction flag is also sometimes referred to as texture_rl_flag, inter_layer_pred_flag, or base_mode_flag.

In the enhancement layer, it may be designated whether the CU type of the target CU is the intra-CU, the inter-layer CU, the inter-CU, or the skip CU.

The intra-CU can be defined similarly with the intra-CU in the base layer. In the intra-CU, the inter-layer image prediction flag is set to "0" and the prediction mode flag is set to "0".

The inter-layer CU can be defined as the CU in which a decoded image of a picture in the reference layer is used to generate a predicted image. In the inter-layer CU, the inter-layer image prediction flag is set to "1" and the prediction mode flag is set to "0".

The skip CU can be defined similarly with the case of the HEVC scheme described above. For example, in the skip CU, the skip flag is set to "1".

The inter-CU may be defined as the CU in which non-skip and motion compensation (MC) is applied. In the inter-CU, for example, the skip flag is set to "0" and the prediction mode flag is set to "1".

As described above, the coded data in the enhancement layer may be generated according to a coding scheme different from the coding scheme of the lower layer. That is, the coding and decoding processes of the enhancement layer do not depend on kinds of codec of the lower layer.

The lower layer may be coded according to, for example, the MPEG-2 or H.264/AVC scheme.

In the enhancement layer coded data, the VPS may be enhanced and a parameter indicating a reference structure between layers may be included.

In the enhancement layer coded data, the SPS, the PPS, and the slice header may be enhanced. Information (for example, a syntax for directly or indirectly deriving an inter-layer reference image set, an inter-layer reference image list, base control information, or the like to be described below) related to the decoded image of the reference layer used for inter-layer image prediction may be included.

The above-described parameters may be coded singly or the plurality of parameters may be coded compositely. In a case in which the plurality of parameters are coded compositely, indexes can be allocated to combinations of the values of the parameters and the allocated indexes are coded. Since the parameters can be derived from other parameters or the decoded information, the coding of the parameters can be omitted.

[Hierarchical Moving Image Decoding Device]

Hereinafter, the configuration of the hierarchical moving image decoding device 1 according to the embodiment will be described with reference to FIGS. 1 to 11.

(Configuration of Hierarchical Moving Image Decoding Device)

Figure 4:
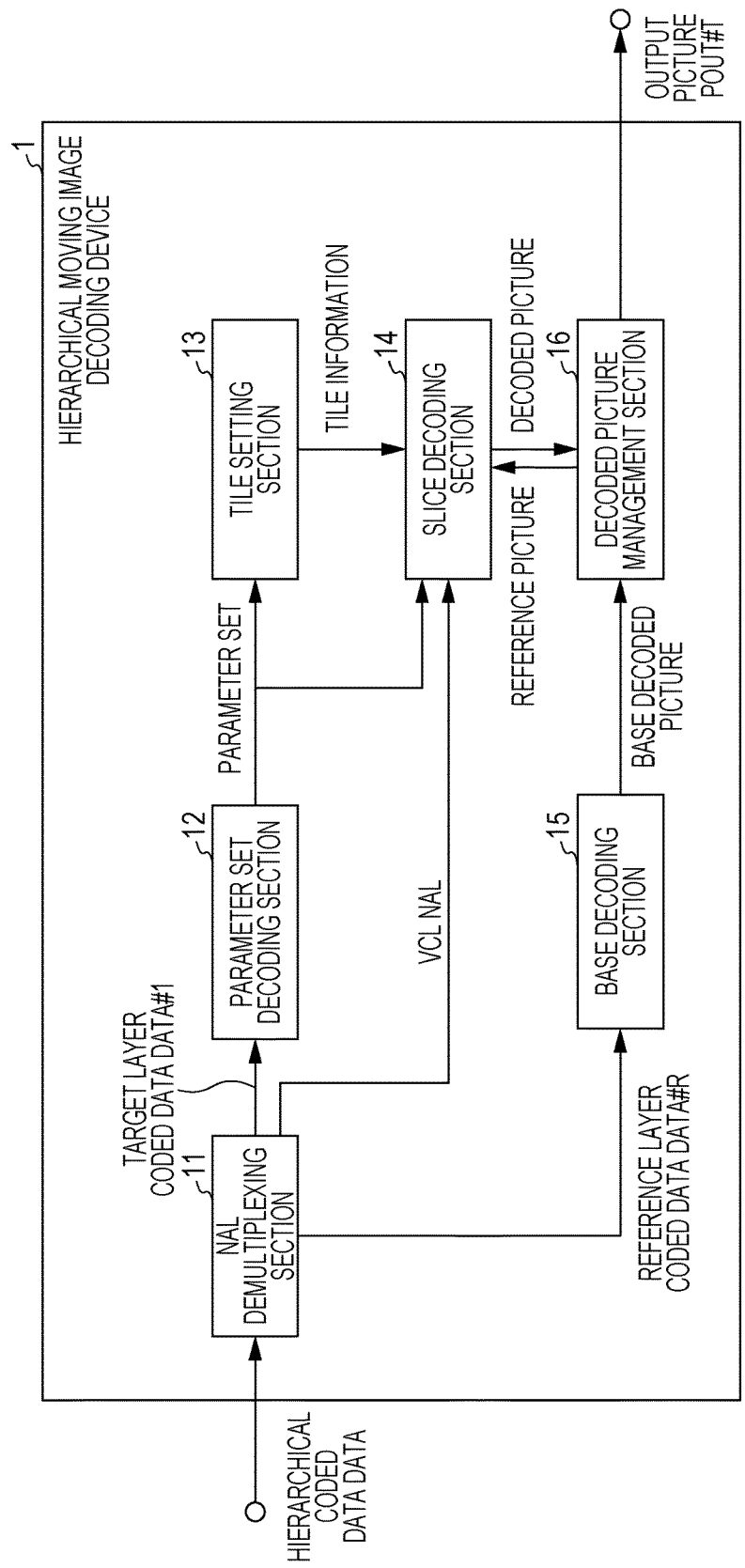
FIG. 4 is a functional block diagram illustrating a schematic configuration of the hierarchical moving image decoding device.

The schematic configuration of the hierarchical moving image decoding device 1 will be described as follows with reference to FIG. 4. FIG. 4 is a functional block diagram illustrating the schematic configuration of the hierarchical moving image decoding device 1. The hierarchical moving image decoding device 1 decodes hierarchically coded data DATA (a hierarchically coded data DATAF supplied from the hierarchical moving image coding device 2) to generate decoded image POUT#T of a target layer. Hereinafter, the target layer is assumed to be an enhancement layer for which a base layer is a reference layer in the description. Therefore, the target layer is also a layer higher than the reference layer. Conversely, the reference layer is a lower layer of the target layer.

As illustrated in FIG. 4, the hierarchical moving image decoding device 1 includes an NAL demultiplexing section 11, a parameter set decoding section 12, a tile setting section 13, a slice decoding section 14, a base decoding section 15, and a decoded picture management section 16.

The NAL demultiplexing section 11 demultiplexes the hierarchically coded data DATA transmitted in a network abstraction layer (NAL) in a NAL unit.

The NAL is a layer that is provided to abstract communication between a video coding layer (VCL) and a lower system that transmits and accumulates coded data.

The VCL is a layer in which a moving image coding process is performed. The coding is performed in the VCL. On the other hand, the lower system mentioned herein corresponds to the file format of H.264/AVC and HEVC or an MPEG-2 system.

In the NAL, a bit stream generated in the VCL is partitioned in a unit referred to as an NAL unit and is transmitted to a lower system which is a destination. The NAL unit includes coded data that is coded in the VCL and a header that is used to properly deliver the coded data to the lower system which is a destination. The coded data in each layer is stored in the NAL unit to be subjected to NAL multiplexing and transmitted to the hierarchical moving image decoding device 1.

The hierarchically coded data DATA includes not only the NAL generated by the VCL but also includes the NAL including parameter sets (VPS, SPS, and PPS) or an SEI. Such an NAL is referred to as a non-VCL NAL in contrast with the VCL NAL.

The NAL demultiplexing section 11 demultiplexes the hierarchically coded data DATA to extract target layer coded data DATA#T and reference layer coded data DATA#$. The NAL demultiplexing section 11 supplies the non-VCL NAL among the NALs included in the target layer coded data DATA#T to the parameter set decoding section 12 and supplies the VCL NAL to the slice decoding section 14.

The parameter set decoding section 12 decodes the parameter set, that is, the VPS, the SPS, and the PPS, from the input non-VCL NAL and supplies the parameter set to the tile setting section 13 and the slice decoding section 14. The details of a process that has high relevance with the present invention in the parameter set decoding section 12 will be described.

The tile setting section 13 derives tile information regarding a picture based on the input parameter set and supplies the tile information to the slice decoding section 14. The tile information includes at least tile splitting information of the picture.

The slice decoding section 14 generates the decoded picture or a partial region of the decoded picture based on the input VCL NAL, parameter set, and tile information, and the reference picture and records the decoded picture or the partial region of the decoded picture on a buffer inside the decoded picture management section 16. The details of the slice decoding section will be described below.

The decoded picture management section 16 records the input decoded picture or base decoded picture on an internal decoded picture buffer (DPB) and performs generation of a reference picture list or decision of an output picture. The decoded picture management section 16 outputs the decoded picture recorded on the DPB as an output picture POUT#T at a predetermined timing to the outside.

The base decoding section 15 decodes the base decoded picture from reference layer coded data DATA#R. The base decoded picture is a decoded picture of a reference layer which is used at the time of decoding the decoded picture of a target layer. The base decoding section 15 records the decoded base decoded picture on the DPB inside the decoded picture management section 16.

Figure 5:
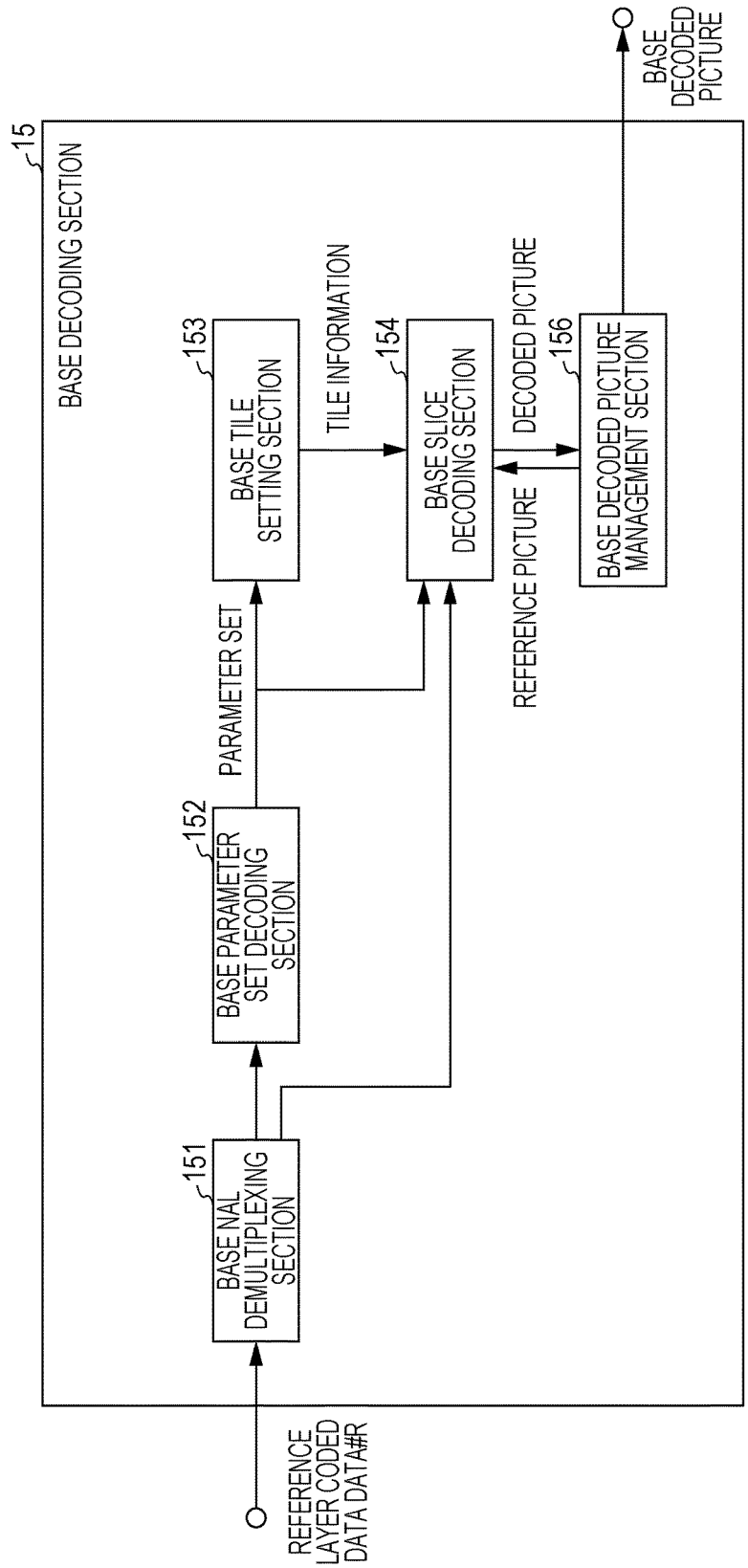
FIG. 5 is a functional block diagram exemplifying the configuration of a base decoding section included in the hierarchical moving image decoding device.

The detailed configuration of the base decoding section 15 will be described with reference to FIG. 5. FIG. 5 is a functional block diagram exemplifying the configuration of the base decoding section 15.

As illustrated in FIG. 5, the base decoding section 15 includes a base NAL demultiplexing section 151, a base parameter set decoding section 152, a base tile setting section 153, a base slice decoding section 154, and a base decoded picture management section 156.

The base NAL demultiplexing section 151 demultiplexes the reference layer coded data DATA#R, extracts the VCL NAL and the non-VCL NAL, supplies the non-VCL NAL to the base parameter set decoding section 152, and supplies the VCL NAL to the base slice decoding section 154.

The base parameter set decoding section 152 decodes the parameter set, that is, the VPS, the SPS, and the PPS, from the input non-VCL NAL and supplies the parameter set to the base tile setting section 153 and the base slice decoding section 154.

The base tile setting section 153 derives tile information regarding the picture based on the input parameter set and supplies the tile information to the base slice decoding section 154.

The base slice decoding section 154 generates a decoded picture or a partial region of the decoded picture based on the input VCL NAL, parameter set, tile information, and reference picture and records the decoded picture or the partial region of the decoded picture on a buffer inside the base decoded picture management section 156.

The base decoded picture management section 156 records the input decoded picture on the internal DPB and performs generation of the reference picture list and decision of an output picture. The base decoded picture management section 156 outputs the decoded picture recorded on the DPB as a base decoded picture at a predetermined timing.

(Parameter Set Decoding Section 12)

The parameter set decoding section 12 decodes the parameter set (the VPS, the SPS, and the PPS) used to decode the target layer from the input coded data of the target layer and outputs the parameter set. In general, the parameter set is decoded based on a pre-decided syntax table. That is, a bit string is read from the coded data in a procedure decided in the syntax table and a syntax value of a syntax component included in the syntax table is decoded. A variable derived based on the decoded syntax value may be included in a parameter set to be output, as necessary. Accordingly, the parameter set output from the parameter set decoding section 12 can be expressed as a set of the syntax value of the syntax component related to the parameter set (the VPS, the SPS, and the PPS) included in the coded data and the variable derived from the syntax value.

Hereinafter, a part of the syntax table related to picture information and inter-layer position correspondence information and having high relevance with the present invention in the syntax table used for decoding in the parameter set decoding section 12 will be described in detail.

(Picture Information)

The parameter set decoding section 12 decodes picture information from input target layer coded data. The picture information is schematically information for deciding the size of a decoded picture of a target layer. For example, the picture information includes information indicating the width and height of the decoded picture of the target layer.

The picture information is included in, for example, the SPS. The picture information decoded from the SPS includes a width (pic_width_in_luma_samples) of the decoded picture and a height (pic_height_in_luma_samples) of the decoded picture. The value of syntax pic_width_in_luma_samples corresponds to the width of the decoded picture in a luminance pixel unit. The value of syntax pic_height_in_luma_samples corresponds to the height of the decoded picture in a luminance pixel unit.

The picture information is shared between layers. That is, the picture information of a different layer from the target layer can be referred to at the time of decoding and coding the target layer.

(Picture Format Information)

The parameter set decoding section 12 decodes picture format information from the input target layer coded data. The picture format information includes at least a color format identifier (chroma_format_idc) which is an identifier of the color format of the decoded picture. The picture format information is included in, for example, the SPS. In this case, the picture format of a specific picture is derived from the picture format information included in the SPS associated with the picture. The picture format information may be included in the VPS. In this case, the picture format of the specific picture is derived from the picture format information associated in the VPS with the layer to which the picture belongs.

The parameter set decoding section 12 derives a luminance pixel width (SubWidthC) per chroma pixel and a luminance pixel height (SubHeightC) per chroma pixel based on the value of the decoded color format identifier. The luminance pixel width (SubWidthC) per chroma pixel is the same as a value obtained by subtracting the width of a pixel unit of a chroma plane from the width of a pixel unit of a luminance plane, and SubWidthC is also referred to as a luminance chroma width ratio. Similarly, the luminance pixel width (SubHeightC) per chroma pixel is the same as a value obtained by subtracting the height of a pixel unit of a chroma plane from the height of a pixel unit of a luminance plane, and SubHeightC is also referred to as a luminance chroma height ratio. The luminance chroma width ratio and the luminance color height ratio are collectively referred to as luminance chroma size ratios.

Figures 6, 7:
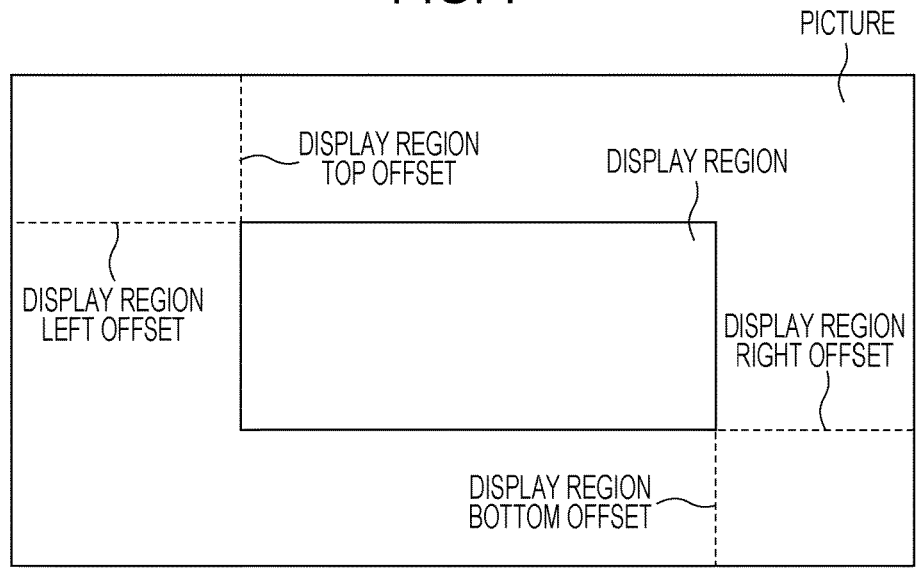
FIG. 6 is a table illustrating a relation among a color format identifier, a color format, a luminance chroma width ratio, and a luminance chroma height ratio.
FIG. 7 is a diagram exemplifying a relation between a display region which is a partial region in a picture and display region position information.

FIG. 6 is a table which is referred to by the parameter set decoding section 12 and a table illustrating a relation among the color format identifier, the color format, the luminance chroma width ratio, and the luminance chroma height ratio. In FIG. 6, the parameter set decoding section 12 derives a color format (Chroma format), the luminance chroma width ratio (SubWidthC), and the luminance chroma height ratio (SubHeightC) from a color format identifier (chroma_format_idc).

(1) In a case in which the color format identifier is "0", the color format of a picture is "monochrome" and values of SubWidthC and SubHeightC are each set to "1". Here, "monochrome" means that a picture is formed by only one image plane (for example, one luminance plane).

(2) In a case in which the color format identifier is "1", the color format of a picture is "4:2:0", the value of SubWidthC is set to "2" and the value of SubHeightC is set to "2". Here, in the color format of "4:2:0", the picture is formed by one luminance plane and two chroma planes. Additionally, the number of vertical pixels of the luminance plane is twice the number of vertical pixels of the chroma plane, and the number of horizontal pixels is likewise twice the number of horizontal pixels of the chroma plane.

(3) In a case in which the color format identifier is "2", the color format of a picture is "4:2:2", the value of SubWidthC is set to "2" and the value of SubHeightC is set to "1". Here, in the color format of "4:2:2", the picture is formed by one luminance plane and two chroma planes. Additionally, the number of vertical pixels of the luminance plane is the same as the number of vertical pixels of the chroma plane, and the number of horizontal pixels of the luminance plane is twice the number of horizontal pixels of the chroma plane.

(4) In a case in which the color format identifier is "3", the color format of a picture is "4:4:4", the value of SubWidthC is set to "1" and the value of SubHeightC is set to "1". Here, in the color format of "4:4:4", the picture is formed by one luminance plane and two chroma planes. Additionally, the number of vertical pixels of the luminance plane is the same as the number of vertical pixels of the chroma plane, and the number of horizontal pixels of the luminance plane is likewise the same as the number of horizontal pixels of the chroma plane.

The process of deriving SubWidthC and SubHeightC in the foregoing (2), (3), and (4) can also be expressed collectively as follows. That is, in a case in which the color format identifier indicates a color format in which a picture is formed by one luminance plane and two chroma planes, the value of the luminance chroma width ratio (SubWidthC) is set to a ratio of the number of horizontal pixels of the luminance plane to the number of horizontal pixels of the chroma plane and the value of the luminance chroma height ratio (SubHeightC) is set to a ratio of the number of vertical pixels of the luminance plane to the number of vertical pixels of the chroma plane.

(Display Region Information)

The parameter set decoding section 12 decodes display region information from the input target layer coded data. The display region information is included in, for example, the SPS. The display region information decoded from the SPS includes a display region flag (conformance_flag). The display region flag indicates whether information indicating the position of a display region (display region position information) is additionally included in the SPS. That is, in a case in which the display region flag is 1, the display region flag indicates that the display region position information is additionally included. In a case in which the display region flag is 0, the display region flag indicates that the display region position information is not additionally included.

In a case in which the display region flag is 1, the display region information decoded from the SPS further includes a display region left offset (conf_win_left_offset), a display region right offset (conf_win_right_offset), a display region top offset (conf_win_top_offset), and a display region bottom offset (conf_win_bottom_offset) as display region position information.

In a case in which the display region flag is 0, an entire picture is set as a display region. Conversely, in a case in which the display region flag is 1, a partial region inside a picture indicated by the display region position information is set. The display region is also referred to as a conformance window.

A relation between the display region position information and the display region will be described with reference to FIG. 7. FIG. 7 is a diagram exemplifying a relation between the display region which is a partial region in a picture and the display region position information. As illustrated, a display region is included in a picture, the display region top offset indicates a picture top side and a distance of the display region top side, the display region left offset indicates a picture left side and a distance of the display region left side, the display region right offset indicates a picture right side and a distance of the display region right side, and the display region bottom offset indicates a picture bottom side and a distance of the display region bottom side. Accordingly, the position and size of the display region in the picture can be uniquely specified by the display region position information. The display region information may be another piece of information by which the position and size of the display region in the picture can be uniquely specified.

(Inter-layer Position Correspondence Information)

The parameter set decoding section 12 decodes the inter-layer position correspondence information from the input target layer coded data. The inter-layer position correspondence information schematically indicates a positional relation between correspondence regions of the target layer and the reference layer. For example, in which a case in which a certain object (object A) is included in a picture of the target layer and a picture of the reference layer, a region corresponding to the object A on the picture of the target layer and a region corresponding to the object A on the picture of the reference layer are equivalent to the correspondence regions of the target layer and the reference layer. The inter-layer position correspondence information may not necessarily be information accurately indicating a positional relation between the correspondence regions of the target layer and the reference layer. In generally, the inter-layer position correspondence information indicates an accurate positional relation between the correspondence regions of the target layer and the reference layer in order to improve accuracy of inter-layer prediction.

(Inter-layer Position Correspondence Information: Scaled Reference Layer Offset)

The inter-layer position correspondence information includes information that defines a scaled reference layer offset. The plurality of scaled reference layer offsets can be included in the coded data. The scaled reference layer offsets are formed by four offsets corresponding to left, top, right and bottom and are associated with a combination of two pictures, a target picture and a reference picture. In other words, information defining corresponding scaled reference layer offsets in regard to a combination of the target picture and a specific reference picture is included in the inter-layer position correspondence information. The information defining the reference layer offset may not necessarily be included in all of the combinations of the target pictures and reference pictures, but may be omitted in some of the combinations under a specific condition and a default value can also be used.

The meanings of the offsets that form the scaled reference layer offsets will be described with reference to FIG. 8. FIG. 8 is a diagram exemplifying a relation among the target layer picture, the reference layer picture, and the inter-layer pixel correspondence offset.

FIG. 8(*a*) illustrates an example of a case in which an entire picture of a reference layer corresponds to a part of a picture of a target layer. In this case, a region (target layer correspondence region) on the target layer corresponding to the entire picture of the reference layer is included inside the picture of the target layer. FIG. 8(*b*) illustrates an example of a case in which a part of the picture of the reference layer corresponds to the entire picture of the target layer. In this case, the picture of the target layer is included inside the correspondence region of the reference layer. The entire target layer picture includes the offsets.

As illustrated in FIG. 8, a scaled reference layer left offset (an SRL left offset in the drawing) indicates an offset of a reference layer correspondence region left side with respect to the target layer picture left side. In a case in which the SRL left offset is greater than 0, it is indicated that the reference layer correspondence region left side is located to the right of the target layer picture left side.

A scaled reference layer top offset (an SRL top offset in the drawing) indicates an offset of a reference layer correspondence region top side with respect to the target layer picture top side. In a case in which the SRL top offset is greater than 0, it is indicated that the reference layer correspondence region top side is located to the bottom of the target layer picture top side.

A scaled reference layer right offset (an SRL right offset in the drawing) indicates an offset of a reference layer correspondence region right side with respect to the target layer picture right side. In a case in which the SRL right offset is greater than 0, it is indicated that the reference layer correspondence region right side is located to the left of the target layer picture right side.

A scaled reference layer bottom offset (an SRL bottom offset in the drawing) indicates an offset of a reference layer correspondence region bottom side with respect to the target layer picture bottom side. In a case in which the SRL bottom offset is greater than 0, it is indicated that the reference layer correspondence region bottom side is located to the top of the target layer picture bottom side.

Next, information defining the scaled reference layer offset (hereinafter referred to as scaled reference layer offset information), included in the coded data, and decoded by the parameter set decoding section 12 will be described. For example, the scaled reference layer offset information is included in an SPS extension (sps_estension) which is a part of the SPS of a higher layer and is decoded according to the syntax table illustrated in FIG. 9. FIG. 9 illustrates a part of the syntax table which is referred to when the parameter set decoding section 12 performs the SPS decoding and which is related to inter-layer pixel correspondence information.

The scaled reference layer offset information decoded from the SPS includes a scaled reference layer offset number (num_scaled_ref_layer_offsets) included in the SPS extension. Additionally, the inter-layer pixel correspondence information includes the number of scaled reference layer offsets indicated by the scaled reference layer offset number in conjunction with identifiers indicating the reference layer associated with the inter-layer pixel correspondence offsets. A scaled reference layer identifier (scaled_ref_layer_id) is an identifier indicating a reference layer with which a subsequent scaled reference layer offset is associated. As the inter-layer pixel correspondence offsets, a scaled reference layer left offset (scaled_ref_layer_left_offset), a scaled reference layer top offset (scaled_ref_layer_top_offset), a scaled reference layer right offset (scaled_ref_layer_right_offset), and a scaled reference layer bottom offset (scaled_ref_layer_bottom_offset) are included. Hereinafter, scaled_ref_layer_left_offset, scaled_ref_layer_top_offset, scaled_ref_layer_right_offset, and scaled_ref_layer_bottom_offset are collectively referred to as a scaled reference layer offset syntax.

The parameter set decoding section 12 decodes the value of the scaled reference layer offset syntax by decoding codes of signed exponential Golomb coding (se(v)) from the coded data. In the signed exponential Golomb coding, specifically, default codes of the same names in HEVC can be used. In the value of the decoded scaled reference layer offset syntax, a chroma pixel of a target picture is used as a unit. A relation of the following equation is established between an offset OY in a luminance pixel unit of the target picture and an offset OC in a chroma pixel unit of the target picture.

$$OY = RYC * OC$$

Here, RYC is a parameter indicating the number of luminance pixels corresponding to one chroma pixel. In offsets (left and right offsets) in the horizontal direction, the luminance chroma width ratio (SubWidthC) in the target picture derived from the picture format information can be used as a value of RYC. In offsets (top and right offsets) in the vertical direction, the luminance chroma height ratio (SubHightC) in the target picture can be used as a value of RYC.

In a case in which the scaled reference layer offset syntax is decoded in the chroma pixel unit and a case in which the color format of the target picture is 4:2:0 or 4:2:2, the value of the scaled reference layer offset syntax can be decoded from a less code amount of codes than in a case in which the scaled reference layer offset syntax is decoded in the luminance pixel unit. Conversely, in a case in which the color format of the target picture is 4:4:4, the scaled reference layer offset syntax can be decoded with higher precision, that is, luminance one-pixel precision, than in a case in which the scaled reference layer offset syntax is decoded in a luminance two-pixel unit.

(Inter-layer Position Correspondence Information: Reference Layer Offset)

The inter-layer position correspondence information includes information defining a reference layer offset (reference layer offset information). The plurality of reference layer offsets can be included in the coded data. The reference layer offsets are formed by four offsets corresponding to left, top, right and bottom and are associated with a combination of two pictures, a target picture and a reference picture. In other words, the corresponding reference layer offset can be included in the inter-layer pixel correspondence information in each combination of the target picture and a specific reference picture.

The reference layer left offset indicates an offset of a reference layer standard region left side with respect to a reference layer picture left side. When the offset value is greater than 0, it is indicated that the reference layer standard region left side is located to the right of a reference layer picture left side.

The reference layer top offset indicates an offset of a reference layer standard region top side with respect to a reference layer picture top side. When the offset value is greater than 0, it is indicated that the reference layer standard region top side is located to the bottom of a reference layer picture top side.

The reference layer right offset indicates an offset of a reference layer standard region right side with respect to a reference layer picture right side. When the offset value is greater than 0, it is indicated that the reference layer standard region right side is located to the left of a reference layer picture right side.

The reference layer bottom offset indicates an offset of a reference layer standard region bottom side with respect to a reference layer picture bottom side. When the offset value is greater than 0, it is indicated that the reference layer standard region bottom side is located to the top of a reference layer picture bottom side.

Next, a syntax corresponding to the reference layer offset information and including a syntax corresponding to the reference layer offset will be described. For example, the reference layer offset information is included in an SPS extension (sps_extension) which is a part of the SPS of a higher layer and is decoded according to the syntax table illustrated in FIG. 10. FIG. 10 illustrates a part of the syntax table which is referred to when the parameter set decoding section 12 performs the SPS decoding and which is related to the reference layer offset information.

The reference layer offset information decoded from the SPS includes a reference layer offset number (num_ref_layer_offsets) included in the SPS extension. Additionally, the inter-layer pixel correspondence information includes the number of reference layer offsets indicated by the reference layer offset number in conjunction with identifiers indicating the reference layer associated with the reference layer offsets. A reference layer identifier (ref_layer_id) is an identifier indicating a reference layer with which a subsequent reference layer offset is associated. As the reference layer offsets, a reference layer left offset (ref_layer_left_offset), a reference layer top offset (ref_layer_top_offset), a reference layer right offset (ref_layer_right_offset), and a reference layer bottom offset (ref_layer_bottom_offset) are included. Hereinafter, ref_layer_left_offset, ref_layer_top_offset, ref_layer_right_offset, and ref_layer_bottom_offset are collectively referred to as a reference layer offset syntax.

The parameter set decoding section 12 decodes the value of the reference layer offset syntax by decoding codes of signed exponential Golomb coding (se(v)) from the coded data. In the value of the decoded reference layer offset syntax, a chroma pixel of a reference layer picture associated via the reference layer offset syntax and the reference layer identifier is used as a unit. A relation of the following equation is established between an offset ROY in a luminance pixel unit of the reference picture and an offset ROC in a chroma pixel unit of the reference picture.

$$ROY = RRYC * ROC$$

Here, RRYC is a parameter indicating the number of luminance pixels corresponding to one chroma pixel of an associated reference picture. In offsets (left and right offsets) in the horizontal direction, the luminance chroma width ratio (SubWidthC) in the associated reference picture derived from the picture format information can be used as a value of RRYC. In offsets (top and right offsets) in the vertical direction, the luminance chroma height ratio (SubHightC) in the target picture can be used as a value of RRYC.

In a case in which the reference layer offset syntax is decoded in the chroma pixel unit and a case in which the color format of the reference picture is 4:2:0 or 4:2:2, the value of the reference layer offset syntax can be decoded from a less code amount of codes than in a case in which the reference layer offset syntax is decoded in the luminance pixel unit. Conversely, in a case in which the color format of the reference picture is 4:4:4, the reference layer offset syntax can be decoded with higher precision, that is, luminance one-pixel precision, than in a case in which the reference layer offset syntax is decoded in a luminance two-pixel unit.

As described above, the scaled reference layer offset information and the reference layer offset information are included as the inter-layer pixel correspondence information. The unit of the syntax indicating each offset is set based on the target layer picture color format or the reference layer picture color format, as described above. Therefore, the units of the syntax corresponding to the scaled reference layer offset and the reference layer offset can be independently set in conformity with the color formats of the target layer and the reference layer.

In the embodiment, the case in which both of the scaled reference layer offset and the reference layer offset are transmitted has been described. However, the advantageous effects of the present invention can be achieved even in a case in which only one of the scaled reference layer offset and the reference layer offset is used, that is, a case in which only the syntax corresponding to one of the offsets is decoded from the coded data.

(Slice Decoding Section 14)

The slice decoding section 14 generates a decoded picture based on the input VCL NAL, parameter set, and tile information and outputs the decoded picture.

A schematic configuration of the slice decoding section 14 will be described with reference to FIG. 11. FIG. 11 is a functional block diagram illustrating the schematic configuration of the slice decoding section 14.

The slice decoding section 14 includes a slice header decoding section 141, a slice position setting section 142, and a CTU decoding section 144. The CTU decoding section 144 includes a prediction residual restoration section 1441, a predicted image generation section 1442, and a CTU decoded image generation section 1443.

(Slice Header Decoding Section)

The slice header decoding section 141 decodes the slice header based on the input VCL NAL and parameter set and outputs the slice header to the slice position setting section 142, a skip slice determination section 143, and the CTU decoding section 144.

The slice header includes information (SH slice position information) regarding to a slice position in a picture and information (SH skip slice information) regarding a skip slice.

The slice header includes a in-picture head slice flag (first_slice_segment_in_pic_flag) as slice position information. In a case in which the in-picture head slice flag is 1, it is indicated that a target slice is located at the head in a picture in a decoding order. In a case in which the in-picture head slice flag is 0, it is indicated that a target slice is not located at the head in a picture in a decoding order.

The slice header includes slice PPS identifier (slice_pic_parameter_set_id) as slice position information. The slice PPS identifier is a PPS identifier associated with the target slice and tile information to be associated with the target slice is specified via the PPS identifier.

(Slice Position Setting Section)

The slice position setting section 142 specifies a slice position in a picture based on the input slice header and tile information and outputs the slice position to the CTU decoding section 144. The slice position in the picture derived by the slice position setting section 142 includes the position of each CTU included in the slice in the picture.

(CTU Decoding Section)

The CTU decoding section 144 schematically generates a decoded image of a slice by decoding a decoded image of a region corresponding each CTU included in the slice based on input slice header, slice data, and parameter set. The decoded image of the slice is output as a part of the decoded picture at a position indicated by an input slice position. The decoded image of the CTU is generated by the prediction residual restoration section 1441, the predicted image generation section 1442, and the CTU decoded image generation section 1443 in the CTU decoding section 144. The prediction residual restoration section 1441 decodes prediction residual information (TT information) included in the input slice data to generate a prediction residual of a target CTU and outputs the prediction residual. The predicted image generation section 1442 generates a predicted image based on a prediction method and a prediction parameter indicated by prediction information (PT information) included in the input slice data and outputs the predicted image. At this time, the coded data or the decoded image of the reference picture is used. The CTU decoded image generation section 1443 generates a decoded image of the target CTU by adding the input predicted image and the prediction residual and outputs the decoded image.

(Details of Predicted Image Generation Section)

The details of a predicted image generation process in a case in which inter-layer image prediction is selected in a predicted image generation process by the above-described predicted image generation section 1442 will be described.

A process of generating a prediction pixel value of a target pixel included in a target CTU to which the inter-layer image prediction is applied is performed in the following procedure. First, a reference picture position derivation process is performed to derive a correspondence reference position. Here, the correspondence reference position is a position on the reference layer corresponding to a target pixel (prediction target pixel) on a target layer picture. More precisely, in a case in which a target of the predicted image generation process is luminance, the correspondence reference position is a position of a reference layer picture on a luminance plane. In a case in which a target of the predicted image generation process is chroma, the correspondence reference position is a position of a reference layer picture on a chroma plane. Since the pixels of the target layer and the reference layer do not necessarily have one-to-one correspondence, the correspondence reference position is expressed with precision less than a pixel unit in the reference layer. Next, by performing an interpolation filter process using a derived correspondence reference position as an input, a prediction pixel value of a target pixel is generated.

Figure 1:
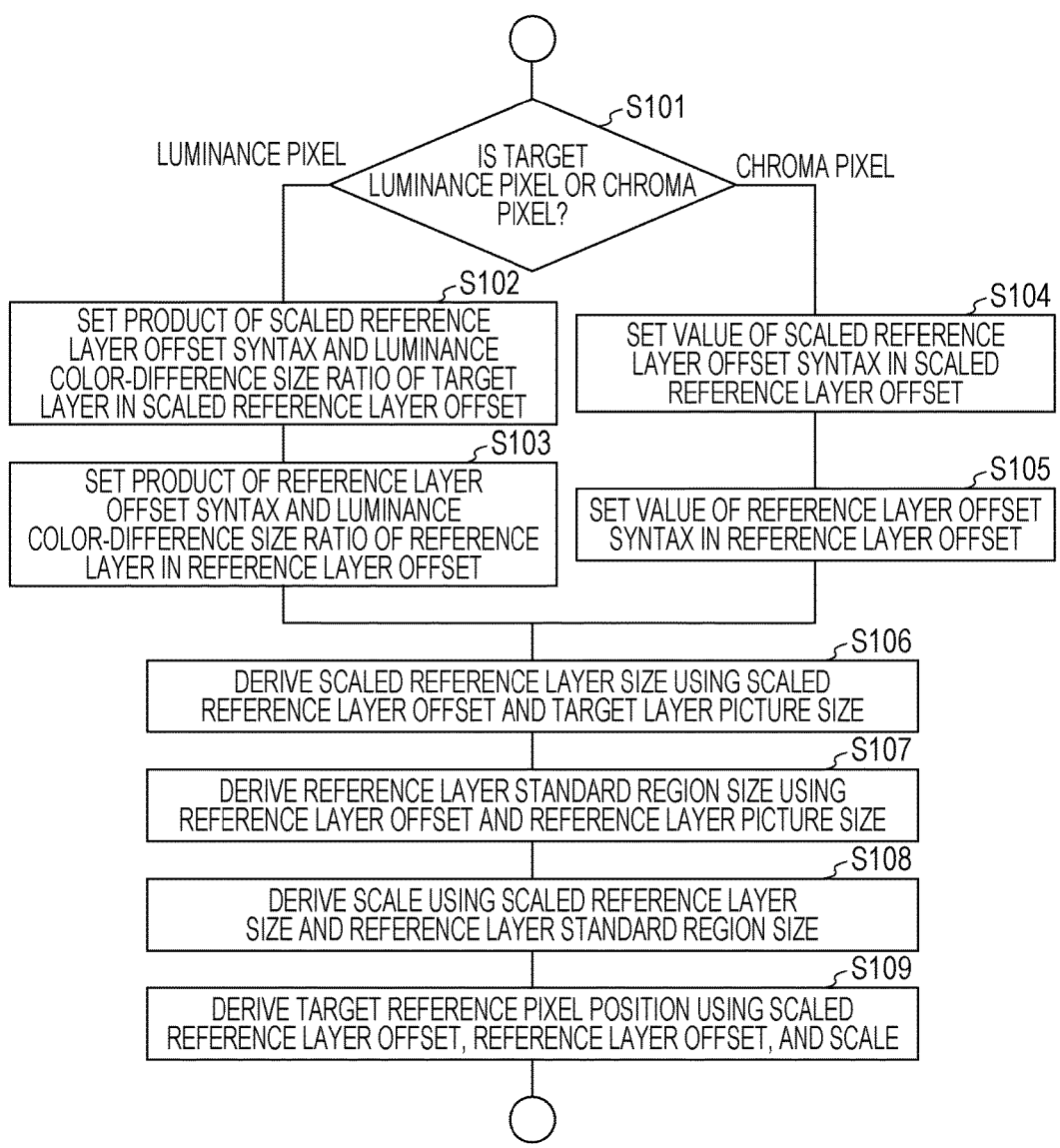
FIG. 1 is a flowchart illustrating a correspondence reference position derivation process performed by a hierarchical moving image decoding device and a hierarchical moving image coding device according to an embodiment.

In a correspondence reference position derivation process, a correspondence reference position is derived based on inter-layer pixel correspondence information and the picture information included in the parameter set. A detailed procedure of the correspondence reference position derivation process will be described with reference to FIG. 1. Hereinafter, a target layer of the correspondence reference position derivation process is assumed to be layer C (in which an index in the VPS of layer C is c) and a reference layer of the target layer is assumed to be layer R (in which an index in the VPS of layer R is r) in the description. Here, a relation in which r is less c is established from two facts in which the reference layer of the target layer is a lower layer than the target layer and a layer corresponding to a small index in the VPS is a lower which is further lower. FIG. 1 is a flowchart illustrating the correspondence reference position derivation process. The correspondence reference position derivation process in the inter-layer image prediction process between layer C and layer R in a case in which layer C is set as a target layer is performed in sequence in the order of the following S101 to S109.

(S101) It is determined whether a target of the predicted image generation process is a luminance pixel or a chroma pixel. In a case in which the target is a luminance pixel, S102 is performed. In a case in which the target is a chroma pixel, S103 is performed.

(S102) A scaled reference layer offset is derived from the value of the scaled reference layer offset syntax corresponding to the reference layer and decoded by the parameter set decoding section 12. Hereinafter, a scaled reference layer offset which is derived and related to a reference layer (layer R) is referred to as SRLO[r]. Additionally, signs and scaled reference layer offsets corresponding to the left, top, right, and bottom and forming SRLO[r] are defined as follows.

Scaled reference layer left offset: SRLLO[r]
Scaled reference layer top offset: SRLTO[r]
Scaled reference layer right offset: SRLRO[r]
Scaled reference layer bottom offset: SRLBO[r]

The offsets SRLLO[r], SRLTO[r], SRLRO[r], and SRLBO[r] which form SRLO[r] are derived based on the value of the corresponding scaled reference layer offset syntax through the following calculation.

$$SRLLO[r]=(scaled\_ref\_layer\_left\_offset[r]*SubWidthC)$$

$$SRLTO[r]=(scaled\_ref\_layer\_top\_offset[r]*SubHeightC)$$

$$SRLRO[r]=(scaled\_ref\_layer\_right\_offset[r]*SubWidthC)$$

$$SRLBO[r]=(scaled\_ref\_layer\_bottom\_offset[r]*SubHeightC)$$

Here, SubWidthC and SubHeightC are variables that are derived from the picture format information in the description of the parameter set decoding section 12 and are a luminance chroma width ratio and a luminance chroma height ratio derived from the color format which matches the target layer.

A process of deriving the scaled reference layer offset can be expressed as follows. That is, in a case in which a target of the predicted image generation process is a luminance pixel, the scaled reference layer offset is derived by a product of the value of the scaled reference layer offset syntax and the luminance chroma size ratio (the luminance chroma width ratio or the luminance chroma height ratio) in the target layer. Subsequently, S103 is performed.

(S103) The reference layer offsets on the reference layer (layer r) are derived. The reference layer offsets are formed by four offsets corresponding to the left, top, right, and bottom (RLLO, RLTO, RLRO, and RLBO in order) and are derived based on the value of the reference layer offset syntax by the following equations.

$$RLLO=(ref\_layer\_left\_offset[r]*RefSubWidthC)$$

$$RLTO=(ref\_layer\_top\_offset[r]*RefSubHeightC)$$

$$RLRO=(ref\_layer\_right\_offset[r]*RefSubWidthC)$$

$$RLBO=(ref\_layer\_bottom\_offset[r]*RefSubHeightC)$$

Here, RefSubWidthC and RefSubHeightC are variables that correspond to the luminance chroma size ratios (SubWidthC and SubHeightC) derived from the picture format information in the description of the parameter set decoding section 12 and are the luminance chroma size ratios derived from the color format which matches the reference layer. That is, the value of SubWidthC derived based on the color format of the reference layer is set in RefSubWidthC and the value of SubHeightC derived based on the color format of the reference layer is set in RefSubHeightC.

A process of deriving the reference layer offsets can be expressed as follows. That is, in a case in which a target of the predicted image generation process is a luminance pixel, the reference layer offset is derived by a product by the value of the reference layer offset syntax and the luminance chroma size ratio in the reference layer. Subsequently, S106 is performed.

(S104) Offsets SRLLO[r], SRLTO[r], SRLRO[r], and SRLBO[r] which form SRLO[j] described in S102 are derived based on the values of the corresponding scaled reference layer offset syntax by the following calculation.

SRLLO[r]=scaled_ref_layer_left_offset[r]

SRLTO[r]=scaled_ref_layer_top_offset[r]

SRLRO[r]=scaled_ref_layer_right_offset[r]

SRLBO[r]=scaled_ref_layer_bottom_offset[r]

A process of deriving the scaled reference layer offsets can be expressed as follows. That is, in a case in which a target of the predicted image generation process is a chroma pixel, the value of the scaled reference layer offset syntax is derived as a scaled reference layer offset.

Subsequently, S105 is performed.

(S105) The reference layer offsets (RLLO, RLTO, RLRO, and RLBO) described in S103 are derived by the following equations.

RLLO=ref_layer_left_offset[r]

RLTO=ref_layer_top_offset[r]

RLRO=ref_layer_right_offset[r]

RLBO=ref_layer_bottom_offset[r]

A process of deriving the reference layer offset can be expressed as follows. That is, in a case in which a target of the predicted image generation process is a chroma pixel, the value of the reference layer offset syntax is derived as the value of the reference layer offset. Subsequently, S106 is performed.

(S106) The size of a scaled reference layer is derived based on the target layer picture size and the scaled reference layer offset derived in S102 or S104. A width (SRLW) and a height (SRLH) of the scaled reference layer are derived based on a width (CL_PICW) and a height (CL_PICH) of the target layer picture by the following equations.

SRLW=CL_PICW−(SRLLO+SRLRO)

SRLH=CL_PICH−(SRLTO+SRLBO)

That is, according to the foregoing equations, the width of the scaled reference layer on the target layer is derived by subtracting a sum of the scaled reference layer left offset and the scaled reference layer right offset from the width of the target layer picture. The same applies to the height of the scaled reference layer on the target layer. Subsequently, S107 is performed. The reason why the sum of the offsets is subtracted in the foregoing equations is that the sign of the offset is defined so that the value of the offset is positive in a case in which the scaled reference layer (the reference layer correspondence region in the drawing) is inside the target layer picture, as illustrated in FIG. 8(a). In contrast, in a case in which the scaled reference layer is outside of the target layer picture and the signs of the offsets are defined so that the values of the offsets are positive as in FIG. 8(b), the offsets are necessarily added, and thus the width and height of the scaled reference layer are derived by the following equations.

SRLW=CL_PICW+(SRLLO+SRLRO)

SRLH=CL_PICH+(SRLTO+SRLBO)

(S107) The size of a region serving as a scale calculation standard on the reference layer (reference layer standard region) is derived based on the size of the reference layer picture and the reference layer offset derived in S103 or S105. A width (RLW) and a height (RLH) of the reference layer standard region are derived based on a width (RL_PICW) and a height (RL_PICH) of the reference layer picture by the following equations.

RLW=RL_PICW−(RLLO+RLRO)

RLH=RL_PICH−(RLTO+RLBO)

That is, according to the foregoing equations, the width of the reference layer standard region is derived by subtracting a sum of the reference layer left offset and the reference layer right offset from the width of the reference layer picture. The same applies to the height of the reference layer standard region. For the reference layer offset, the sign of the offset can be reversed as in the scaled reference layer offset. In this case, a width (RLW) and a height (RLH) of the reference layer standard region are respectively derived based on a width (RL_PICW) and a height (RL_PICH) of the reference layer picture by the following equations.

RLW=RL_PICW+(RLLO+RLRO)

RLH=RL_PICH+(RLTO+RLBO)

Subsequently, S108 is performed.

(S108) Scales used for inter-layer prediction is derived based on the size of the scaled reference layer derived in S106 and the size of the reference layer standard region derived in S107. A scale sx in the horizontal direction and a scale sy in the vertical direction are respectively derived by the following equations.

sx=((RLW<<16)+(SRLW>>1))/SRLW sy=((RLH<<16)+(SRLH>>1))/SRLH

An operator "/" is an operator that represents division of an integer.

That is, according to the foregoing equations, values obtained by multiplying the sizes of the reference layer reference regions by a predetermined constant ("<<16" in the foregoing equations) and dividing the values by the sizes of the target layer reference regions. The term "(SRLW>>1)" is a term for adjusting rounding by division. Accordingly, when the effect of a unit or rounding adjustment is excluded, the scale can be described as a ratio of the size (width or height) of the reference layer standard region to the size (width or height) of the scaled reference layer. Next, S109 is performed.

(S109) A reference pixel position with pixel precision of 1/16 is derived based on the scaled reference layer offsets derived in S102 or S104, the reference layer standard region offsets derived in S103 or S105, and the scales derived in S108. The values of a horizontal component (x component) xRef16 and a vertical component (y component) yRef16 of the reference pixel position with pixel precision of 1/16 on the reference layer correspond to a pixel position (xP, yP) on the target layer are respectively derived by the following equations.

xRef16=(((xP−CL_OX)*sx+addX+(1<<11))>>12)+deltaX+RL_OX yRef16=(((yP−CL_OY)*sy+addY+(1<<11))>>12)+deltaY+RL_OY where

CL_OX=SRLTO

CL_OY=SRLTO $$RL\_OX=(RLLO<<4)$$

$$RL\_OY=(RLTO<<4)$$

Further, addX, addY, deltaX, and deltaY are parameters indicating deviation between a pixel on the target layer and a pixel on the reference layer which is caused by upsampling or interlacing.

That is, according to the foregoing equations, the reference pixel position is calculated based on the scaled reference layer offsets, the reference layer standard region offsets, and the scales. The correspondence reference position derivation process ends by setting the derived reference pixel position with pixel precision of $1/16$ as the correspondence reference position.

The processes of (S101), (S102), and (S104) can be described in the following equations using a ternary operator. Further, cIdx is an identifier designating a plane in which a target of the predicted image generation process forms a picture, cIdx=0 indicates a luminance plane, and cIdx=1 and 2 indicate a chroma plane.

$$SRLLO[r]=cIdx==0?(scaled\_ref\_layer\_left\_offset[r]*SubWidthC): scaled\_ref\_layer\_left\_offset[r]$$

$$SRLTO[r]=cIdx==0?(scaled\_ref\_layer\_top\_offset[r]*SubHeightC): scaled\_ref\_layer\_top\_offset[r]$$

$$SRLRO[r]=cIdx==0?(scaled\_ref\_layer\_right\_offset[r]*SubWidthC): scaled\_ref\_layer\_right\_offset[r]$$

$$SRLBO[r]=cIdx==0?(scaled\_ref\_layer\_bottom\_offset[r]*SubHeightC): scaled\_ref\_layer\_bottom\_offset[r]$$

The processes of (S101), (S103), and (S105) can also be described in the following equations using a ternary operator.

$$RLLO=cIdx==0?(ref\_layer\_left\_offset[r]*RefSubWidthC): ref\_layer\_left\_offset[r]$$

$$RLTO=cIdx==0?(ref\_layer\_top\_offset[r]*RefSubHeightC): ref\_layer\_top\_offset[r]$$

$$RLRO=cIdx==0?(ref\_layer\_right\_offset[r]*RefSubWidthC): ref\_layer\_right\_offset[r]$$

$$RLBO=cIdx==0?(ref\_layer\_bottom\_offset[r]*RefSubHeightC): ref\_layer\_bottom\_offset[r]$$

In a case in which only the syntax corresponding to one offset of the scaled reference layer offset and the reference layer offset is decoded from coded data, a non-correspondence process is not performed (not included) in the correspondence reference position derivation process.

That is, in a case in which only the scaled reference layer offset is decoded, the processes of S102 and S104 in regard to the scaled reference layer offsets are performed, but the processes of S103 and S105 in regard to the reference layer offsets are not included. The width (RLW) and the height (RLH) of the reference layer standard region in the process of S107 are respectively derived by the following equations.

$$RLW=RL\_PICW$$

$$RLH=RL\_PICH$$

The reference pixel position with the pixel precision of $1/16$ in the process of S109 is derived by the following equations.

$$xRef16=(((xP-CL\_OX)*sx+addX+(1<<11))>>12)+deltaX$$

$$yRef16=(((yP-CL\_OY)*sy+addY+(1<<11))>>12)+deltaY$$

In contrast, when only the reference layer offset is decoded, the processes of S103 and S105 in regard to the reference layer offsets are performed, but the processes of S102 and S104 in regard to the scaled reference layer offsets are not included. Derivation is performed based on the width (CL_PICW) and the height (CL_PICH) of the target layer picture in the process of S106 by the following equations.

$$SRLW=CL\_PICW$$

$$SRLH=CL\_PICH$$

The reference pixel position with the pixel precision of $1/16$ in the process of S109 is derived by the following equations.

$$xRef16=((xP*sx+addX+(1<<11))>>12)+deltaX+RL\_OX$$

$$yRef16=((yP*sy+addY+(1<<11))>>12)+deltaY+RL\_OY$$

In an interpolation filter process, a pixel value of a position corresponding to the correspondence reference position derived in the correspondence reference position derivation process is generated by applying an interpolation filter to decoded pixels of pixels near the correspondence reference position on the reference layer picture.

(Advantageous Effects of Moving Image Decoding Device 1)

The hierarchical moving image decoding device 1 (hierarchical image decoding device) according to the above-described embodiment includes the parameter set decoding section 12 that decodes the parameter set and the predicted image generation section 1442 that generates a predicted image through the inter-layer prediction with reference to the decoded pixels of the reference layer picture. The parameter set decoding section 12 decodes the scaled reference layer offset coded in the chroma pixel unit. The predicted image generation section 1442 derives the scaled reference layer offset by the product of the value of the scaled reference layer offset syntax and the luminance chroma size ratio of the target layer, calculates the scale based on the scaled reference layer offset, derives the correspondence reference position with reference to the scale, and performs the inter-layer prediction.

Accordingly, in a case in which the color format of the target picture is 4:2:0 or 4:2:2, the hierarchical moving image decoding device 1 can decode the value of the reference layer offset syntax from a less code amount of codes than in a case in which the reference layer offset syntax is decoded in the luminance pixel unit. Further, in a case in which the color format of the reference picture is 4:4:4, the hierarchical moving image decoding device 1 can decode the reference layer offset syntax with higher precision, that is, luminance one-pixel precision, than in a case in which the reference layer offset syntax is decoded in a luminance two-pixel unit.

[Modification Example 1: Reference Layer Offset]

In a case in which the decoding of the reference layer offset syntax which is decoded by the parameter set decoding section 12 is omitted in the above-described hierarchical moving image decoding device 1, the reference layer offset derived based on the value of the reference layer offset syntax in the predicted image generation section 1442 is preferably matched to the scaled reference layer offset in consideration of the scale.

For example, in a case in which the decoding of the reference layer offset syntax associated with the target layer C and the reference layer R is omitted, a default reference layer offset DEF_RLO is set to the reference layer offset in the predicted image generation section 1442. DEF_RLO is formed by DEF_RLLO, DEF_RLTO, DEF_RLRO, and DEF_RLBO corresponding to left, top, right, and bottom offsets and are respectively derived by the following equations.

DEF_RLLO=−SRLLO*RL_PICW/CL_PICW

DEF_RLTO=−SRLTO*RL_PICH/CL_PICH

DEF_RLRO=−SRLRO*RL_PICW/CL_PICW

DEF_RLBO=−SRLBO*RL_PICH/CL_PICH

That is, as the value of the reference layer offset, a value obtained by converting the value of the corresponding scaled reference layer offset based on a ratio of size (width or height) between the reference layer picture and the target layer picture is set. Here, the polarity (positive or negative sign) is reversed after multiplying the scaled reference layer offset by the reference layer picture and dividing the size of the target layer picture. This is a case in which the positive directions of the reference layer picture and the scaled reference layer offset are defined to be opposite (for example, an outward direction of the scaled reference layer offset is positive and the inward direction of the reference layer picture is positive). In a case in which both of the offset syntaxes are set in the same direction, it is not necessary to reverse the polarity, as will illustrated below.

DEF_RLLO=SRLLO*RL_PICW/CL_PICW

DEF_RLTO=SRLTO*RL_PICH/CL_PICH

DEF_RLRO=SRLRO*RL_PICW/CL_PICW

DEF_RLBO=SRLBO*RL_PICH/CL_PICH

In a case in which the size {the horizontal width, the vertical width} of the reference layer picture of the luminance component is {RL_PICW, RL_PICH} and the size of the target layer picture is {CL_PICW, CL_PICH}, the size of the reference layer picture of the chroma component is {RL_PICW/RefSubWidthC, RL_PICH/RefSubHeightC} and the size of the target layer picture is {CL_PICW/SubWidthC, CL_PICH/SubHeightC}. Therefore, in a case in which a target pixel is a chroma pixel, the value of the reference layer offset can be derived by the following equations.

DEF_RLLO'=−SRLLO*(RL_PICW/RefSubWidthC)/(CL_PICW/SubWidthC)

DEF_RLTO'=−SRLTO*(RL_PICH/RefSubHeightC)/(CL_PICH/SubHeightC)

DEF_RLRO'=−SRLRO*(RL_PICW/RefSubWidthC)/(CL_PICW/SubWidthC)

DEF_RLBO'=−SRLBO*(RL_PICH/RefSubHeightC)/(CL_PICH/SubHeightC)

"−" is a sign for correcting the direction of the offset syntax.

In a case in which the decoding of the reference layer offset syntax associated with the target layer C and the reference layer R is omitted, the reference layer offset syntax may be derived from the scaled reference layer offset syntax. Even in this case, as the value of the reference layer offset syntax, a value obtained by converting the value of the corresponding scaled reference layer offset syntax based on a ratio of size (width or height) between the reference layer picture and the target layer picture is set.

ref_layer_left_offset[r]=−scaled_ref_layer_left_offset[r]*RL_PICW/CL_PICW ref_layer_top_offset[r]=−scaled_ref_layer_top_offset[r]*RL_PICH/CL_PICH ref_layer_right_offset[r]=−scaled_ref_layer_right_offset[r]*RL_PICW/CL_PICW ref_layer_bottom_offset[r]=−scaled_ref_layer_bottom_offset[r]*RL_PICH/CL_PICH "−" is a sign for correcting the direction of the offset syntax.

The foregoing description can be applied directly to a case in which the luminance chroma size ratio {RefSubWidthC, RefSubHeightC} of the reference layer picture is the same as the luminance chroma size ratio {SubWidthC, SubHeightC} of the target layer picture.

In consideration of the luminance chroma size ratio, the reference layer offset syntax may be derived by the following equations.

ref_layer_left_offset[r]=−scaled_ref_layer_left_offset[r]*RL_PICW/CL_PICW*(SubWidthC/RefSubWidthC)

ref_layer_top_offset[r]=−scaled_ref_layer_top_offset[r]*RL_PICH/CL_PICH*(SubHeightC/RefSubHeightC)

ref_layer_right_offset[r]=−scaled_ref_layer_right_offset[r]*RL_PICW/CL_PICW*(SubWidthC/RefSubWidthC)

ref_layer_bottom_offset[r]=−scaled_ref_layer_bottom_offset[r]*RL_PICH/CL_PICH*(SubHeightC/RefSubHeightC)

For example, in a case in which the reference layer offset syntax (ref_layer_left_offset[r], ref_layer_top_offset[r], ref_layer_right_offset[r], ref_layer_bottom_offset[r]) associated with the target layer C and the reference layer R (layer index r) is omitted, 0 may be set as each syntax value. In a case in which the target pixel is the luminance pixel in the correspondence reference position derivation process in the predicted image generation section 1442, values of the reference layer offsets may be derived using the values of DEF_RLO described above by the following equations.

RLLO=(ref_layer_left_offset[r]*RefSubWidthC)+DEF_RLLO

RLTO=(ref_layer_top_offset[r]*RefSubHeightC)+DEF_RLTO

RLRO=(ref_layer_right_offset[r]*RefSubWidthC)+DEF_RLRO

RLBO=(ref_layer_bottom_offset[r]*RefSubHeightC)+DEF_RLBO

That is, the value of the reference layer offset is derived based on a value obtained by adding the product of the value of the reference layer offset syntax and the luminance chroma size ratio to the default value (DEF_RLO) of the reference layer offset. In a case in which the value of the reference layer offset syntax is omitted, the value of the product is 0. Therefore, a reference layer offset default value is set as the value of the reference layer offset.

In a case in which the target pixel is a chroma pixel, values of the reference layer offsets can be derived by the following equations.

RLLO=ref_layer_left_offset[r]+DEF_RLLO'

RLTO=ref_layer_top_offset[r]+DEF_RLTO'

RLRO=ref_layer_right_offset[r]+DEF_RLRO'

RLBO=ref_layer_bottom_offset[r]+DEF_RLBO'

That is, the values of the reference layer offsets are derived based on values obtained by adding the values of the reference layer offset syntax to the default values (DEF_RLO) of the reference layer offset.

According to the modification example, in a case in which the reference layer offset syntax is omitted, the offset values corresponding to the scaled reference layer offsets are set in the reference layer offsets. Typically, an entire target layer picture and an entire reference layer picture correspond to the physically same region in many cases. According to the foregoing method, the reference layer offset syntax can be omitted in such typical cases. Accordingly, it is possible to decode the reference layer offset from a small code amount of coded data.

[Modification Example 2: Scaled Reference Layer Offset]

In a case in which the decoding of the extention reference layer offset syntax which is decoded by the parameter set decoding section 12 is omitted in the above-described hierarchical moving image decoding device 1, the scaled reference layer offset derived based on the value of the scaled reference layer offset syntax in the predicted image generation section 1442 is preferably matched to the reference layer offset in consideration of the scale.

For example, in a case in which the decoding of the scaled reference layer offset syntax associated with the target layer C and the reference layer R is omitted, a default scaled reference layer offset DEF_SRLO is set to the value of the scaled reference layer offset in the predicted image generation section 1442. DEF_SRLO is formed by DEF_SRLLO, DEF_SRLTO, DEF_SRLRO, and DEF_SRLBO corresponding to left, top, right, and bottom offsets and are respectively derived by the following equations.

For example, in a case in which the decoding of the scaled reference layer offset syntax associated with the target layer C and the reference layer R is omitted, a default scaled reference layer offset DEF_SRLO is set to the value of the scaled reference layer offset in the predicted image generation section 1442. DEF_SRLO is formed by DEF_SRLLO, DEF_SRLTO, DEF_SRLRO, and DEF_SRLBO corresponding to left, top, right, and bottom offsets and are respectively derived by the following equations.

DEF_SRLLO=-RLLO*CL_PICW/RL_PICW

DEF_SRLTO=-RLTO*CL_PICH/RL_PICH

DEF_SRLRO=-RLRO*CL_PICW/RL_PICW

DEF_SRLBO=-RLBO*CL_PICH/RL_PICH

That is, as the value of the scaled reference layer offset, a value obtained by converting the value of the corresponding reference layer offset based on a ratio of size (width or height) between the reference layer picture and the target layer picture is set. Here, the polarity is reversed after multiplying the reference layer offset by the reference layer picture and dividing the size of the target layer picture. This is a case in which the positive directions of the reference layer picture and the reference layer offset are defined to be opposite (for example, an outward direction of the scaled reference layer offset is positive and the inward direction of the reference layer picture is positive). In a case in which both of the offset syntaxes are set in the same direction, it is not necessary to reverse the polarity, as will illustrated below.

DEF_SRLLO=-RLLO*CL_PICW/RL_PICW

DEF_SRLTO=-RLTO*CL_PICH/RL_PICH

DEF_SRLRO=-RLRO*CL_PICW/RL_PICW

DEF_SRLBO=-RLBO*CL_PICH/RL_PICH

In a case in which the size {the horizontal width, the vertical width} of the reference layer picture of the luminance component is {RL_PICW, RL_PICH} and the size of the target layer picture is {CL_PICW, CL_PICH}, the size of the chroma component of the reference layer picture is {RL_PICW/RefSubWidthC, RL_PICH/RefSubHeightC} and the size of the chroma component of the target layer picture is {CL_PICW/SubWidthC, CL_PICH/SubHeightC}. Therefore, in which a target pixel is a chroma pixel, the value of the scaled reference layer offset can be derived by the following equations.

DEF_SRLLO'=-RLLO*(CL_PICW/SubWidthC)/(RL_PICW/RefSubWidthC)

DEF_SRLTO'=-RLTO*(CL_PICW/SubHeightC)/(RL_PICW/RefSubHeightC)

DEF_SRLRO'=-RLRO*(CL_PICW/SubWidthC)/(RL_PICW/RefSubWidthC)

DEF_SRLBO'=-RLBO*(CL_PICW/SubHeightC)/(RL_PICW/RefSubHeightC)

"-" is a sign for correcting the direction of the offset syntax.

In a case in which the decoding of the scaled reference layer offset syntax associated with the target layer C and the reference layer R is omitted, the scaled reference layer offset syntax may be derived from the reference layer offset syntax. Even in this case, as the value of the reference layer offset syntax, a value obtained by converting the value of the corresponding reference layer offset syntax based on a ratio of size (width or height) between the reference layer picture and the target layer picture is set.

scaled_ref_layer_left_offset[r]=-ref_layer_left_offset[r]*CL_PICW/RL_PICW scaled_ref_layer_top_offset[r]=-ref_layer_top_offset[r]*CL_PICH/RL_PICH scaled_ref_layer_right_offset[r]=-ref_layer_right_offset[r]*CL_PICW/RL_PICW scaled_ref_layer_bottom_offset[r]=-ref_layer_bottom_offset[r]*CL_PICH/RL_PICH "-" is used to correct the direction of the offset syntax.

The foregoing description can be applied directly to a case in which the luminance chroma size ratio {RefSubWidthC, RefSubHeightC} of the reference layer picture is the same as the luminance chroma size ratio {SubWidthC, SubHeightC} of the target layer picture.

In consideration of the luminance chroma size ratio, the reference layer offset syntax may be derived by the following equations.

scaled_ref_layer_left_offset[r]=−ref_layer_left_offset[r]*CL_PICW/RL_PICW* (RefSubWidtchC/SubWidthC)

scaled_ref_layer_top_offset[r]=−ref_layer_top_offset[r]*CL_PICH/RL_PICH* (RefSubHeightC/SubHeightC)

scaled_ref_layer_right_offset[r]=−ref_layer_right_offset[r]*CL_PICW/RL_PICW* (RefSubWidthC/SubWidthC)

scaled_ref_layer_bottom_offset[r]=−ref_layer_bottom_offset[r]*CL_PICH/RL_PICH* (RefSubHeightC/SubHeightC)

For example, in a case in which the scaled reference layer offset syntax (scaled_ref_layer_left_offset[r], scaled_ref_layer_top_offset[r], scaled_ref_layer_right_offset[r], scaled_ref_layer_bottom_offset[r]) associated with the target layer C and the reference layer R (layer index r) is omitted, 0 may be set as each syntax value. In a case in which the target pixel is the luminance pixel in the correspondence reference position derivation process in the predicted image generation section 1442, values of the reference layer offsets may be derived using the values of DEF_SRRLO described above by the following equations.

SRLLO=(scaled_ref_layer_left_offset[r]*RefSubWidthC)+DEF_SRLLO

SRLTO=(scaled_ref_layer_top_offset[r]*RefSubHeightC)+DEF_SRLTO

SRLRO=(scaled_ref_layer_right_offset[r]*RefSubWidthC)+DEF_SRLRO

SRLBO=(scaled_ref_layer_bottom_offset[r]*RefSubHeightC)+DEF_SRLBO

That is, the value of the reference layer offset is derived based on a value obtained by adding the product of the value of the reference layer offset syntax and the luminance chroma size ratio to the default value (DEF_RLO) of the reference layer offset. In a case in which the value of the reference layer offset syntax is omitted, the value of the product is 0. A reference layer offset default value is set as the value of the reference layer offset.

In a case in which the target pixel is a chroma pixel, values of the reference layer offsets can be derived by the following equations.

SRLLO=scaled_ref_layer_left_offset[r]+DEF_SRLLO'

SRLTO=scaled_ref_layer_top_offset[r]+DEF_SRLTO'

SRLRO=scaled_ref_layer_right_offset[r]+DEF_SRLRO'

SRLBO=scaled_ref_layer_bottom_offset[r]+DEF_SRLBO'

That is, the values of the scaled reference layer offsets are derived based on values obtained by adding the values of the scaled reference layer offset syntax to the default values (DEF_SRLO) of the scaled reference layer offset.

According to the modification example, in a case in which the scaled reference layer offset syntax is omitted, the offset values corresponding to the reference layer offsets are set in the scaled reference layer offsets. Typically, an entire target layer picture and an entire reference layer picture correspond to the physically same region in many cases. According to the foregoing method, the scaled reference layer offset syntax can be omitted in such typical cases. Accordingly, it is possible to decode the scaled reference layer offset from a small code amount of coded data.

[Modification Example 3: Transmission Position of Offsets]

The reference layer offset syntax or the scaled reference layer offset syntax which is decoded from the SPS extension (SPS) by the parameter set decoding section 12 in the above-described hierarchical moving image decoding device 1 has been described. The reference layer offset syntax or the scaled reference layer offset syntax may be decoded from another parameter set or header. For example, the reference layer offset syntax or the scaled reference layer offset syntax may be decoded from the VPS, the PPS, or the slice header. Specifically, in a case in which the offsets are not changed for each picture, the VPS or the SPS may include an offset syntax. In a case in which the offsets are not changed for each picture, the PPS or the slice header preferably include the offset syntax.

In a case in which the position of a region of interest on the side of a target layer is moved in a picture unit, it is necessary to move a target layer correspondence region on a corresponding reference layer. At this time, on the assumption that the reference layer correspondence region is moved by the scaled reference layer offsets as in FIG. 8(*b*) and the target layer correspondence region is moved in the reference layer picture, the target layer correspondence region can also be moved directly in the reference layer picture based on the reference layer offsets. That is, it is also possible to take one of a method of setting the scaled reference layer offsets and a method of setting the reference layer offsets. However, since the PPS or the slice header is frequently coded, overhead is considerable. Therefore, it is not desirable to include the offset syntax in the PPS or the slice header in regard to both of the scaled reference layer offset and the reference layer offset in order to move the position of the region of interest in the picture unit since the code amount may increase.

Suitably, it is desirable not to change the reference layer offsets in the picture unit by changing the scaled reference layer offsets in the picture unit. Thus, it is possible to move the region of interest on the target layer in the picture unit and reduce the code amount of the reference layer offset information.

More specifically, the parameter set decoding section 12 preferably has a configuration in which the scaled reference layer offset syntax is decoded from at least one of the PPS and the slice header and the reference layer offset syntax is decoded from the VPS or the SPS.

(Configuration of Hierarchical Moving Image Coding Device)

Figure 12:
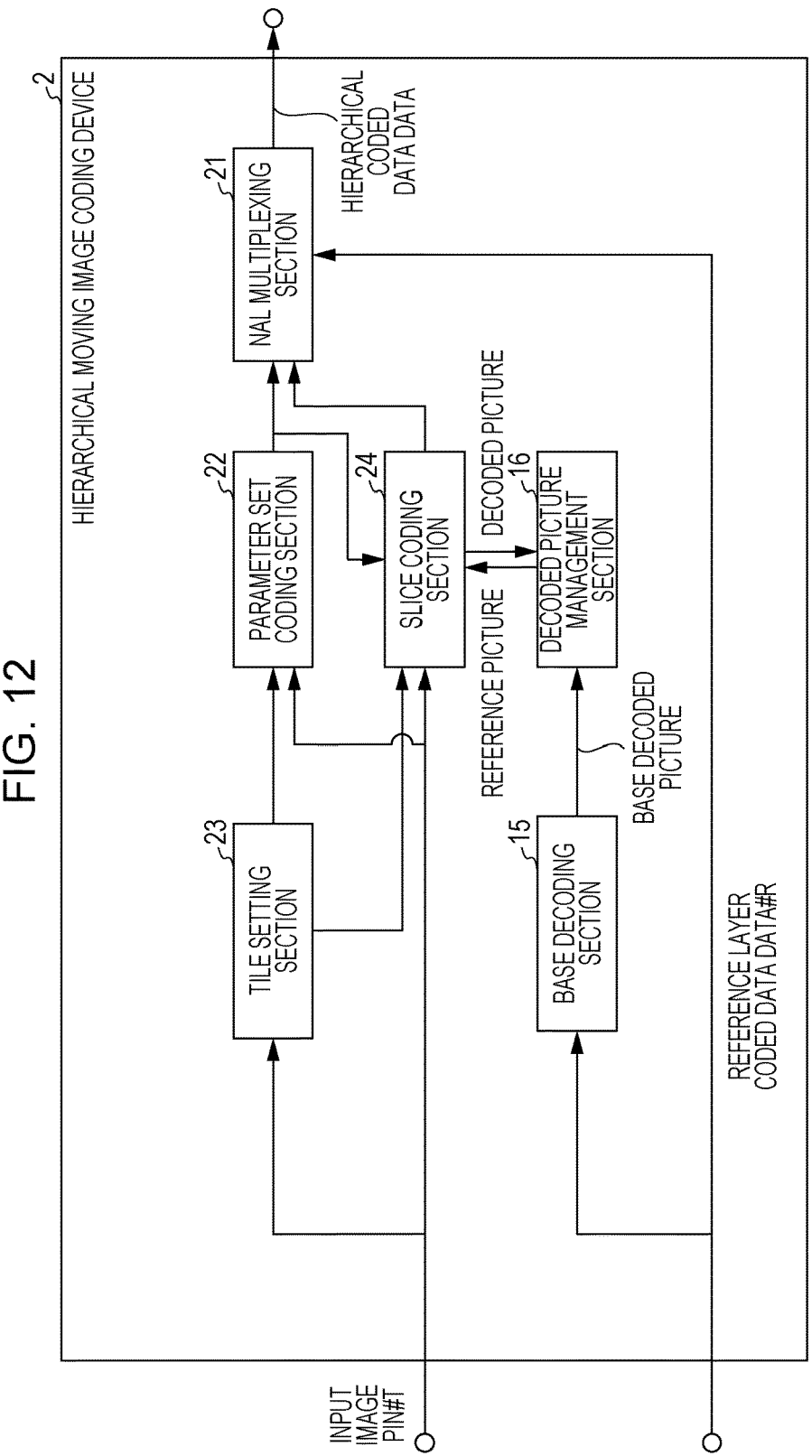
FIG. 12 is a functional block diagram illustrating a schematic configuration of a hierarchical moving image coding device according to an embodiment of the present invention.

A schematic configuration of the hierarchical moving image coding device 2 will be described with reference to FIG. 12. FIG. 12 is a functional block diagram illustrating a schematic configuration of the hierarchical moving image coding device 2. The hierarchical moving image coding device 2 codes an input image PIN#T of a target layer with reference to reference layer coded data DATA#R to generate hierarchical coded data DATA of the target layer. The reference layer coded data DATA#R is assumed to be coded in a hierarchical moving image coding device corresponding to a reference layer.

As illustrated in FIG. 12, the hierarchical moving image coding device 2 includes an NAL multiplexing section 21, a parameter set coding section 22, a tile setting section 23, a slice coding section 24, a decoded picture management section 16, and a base decoding section 15.

The NAL multiplexing section 21 generates NAL-multiplexed hierarchical moving image coded data DATA by storing input target layer coded data DATA#T and reference layer coded data DATA#R in an NAL unit and outputs the NAL-multiplexed hierarchical moving image coded data DATA to the outside.

The parameter set coding section 22 sets the parameter set (the VPS, the SPS, and the PPS) used to code an input image based on input tile information and the input image, packetizes the parameter set as a part of the target layer coded data DATA#T in the format of the VCL NAL, and supplies the packetized parameter set to the NAL multiplexing section 21.

The parameter set coded by the parameter set coding section 22 includes at least picture information, display region information, picture format information, and inter-layer position correspondence information (scaled reference layer offset information and reference layer offset information) described in relation to the hierarchical moving image decoding device 1. The parameter set coding section 22 codes a scaled reference layer offset syntax included in the scaled reference layer offset information in a chroma pixel unit of the target layer. The reference layer offset syntax included in the reference layer offset information is coded in the chroma pixel unit of the reference layer.

The tile setting section 23 sets tile information of a picture based on the input image and supplies the tile information to the parameter set coding section 22 and the slice coding section 24. For example, the tile information indicating that a picture size is partitioned into M×N tiles is set. Here, M and N are any positive integer.

The slice coding section 24 codes a part of the input image corresponding to a slice that forms a picture based on the input image, parameter set, and tile information and the reference picture recorded in the decoded picture management section 16 to generate coded data of the part, and supplies the coded data as a part of the target layer coded data DATA#T to the NAL multiplexing section 21. The details of the slice coding section 24 will be described.

The decoded picture management section 16 is the same constituent element as the decoded picture management section 16 included in the above-described hierarchical moving image decoding device 1. Since it is not necessary to output a picture recorded on an internal DPB of the decoded picture management section 16 included in the hierarchical moving image coding device 2 as an output picture, the output can be omitted. In the description of the decoded picture management section 16 of the hierarchical moving image decoding device 1, description made as "decoding" can be substituted with "coding" to be applied to the decoded picture management section 16 of the hierarchical moving image coding device 2.

The base decoding section 15 is the same constituent element as the base decoding section 15 included in the above-described hierarchical moving image decoding device 1, and thus the detailed description will be omitted.

(Slice Coding Section)

Figure 13:
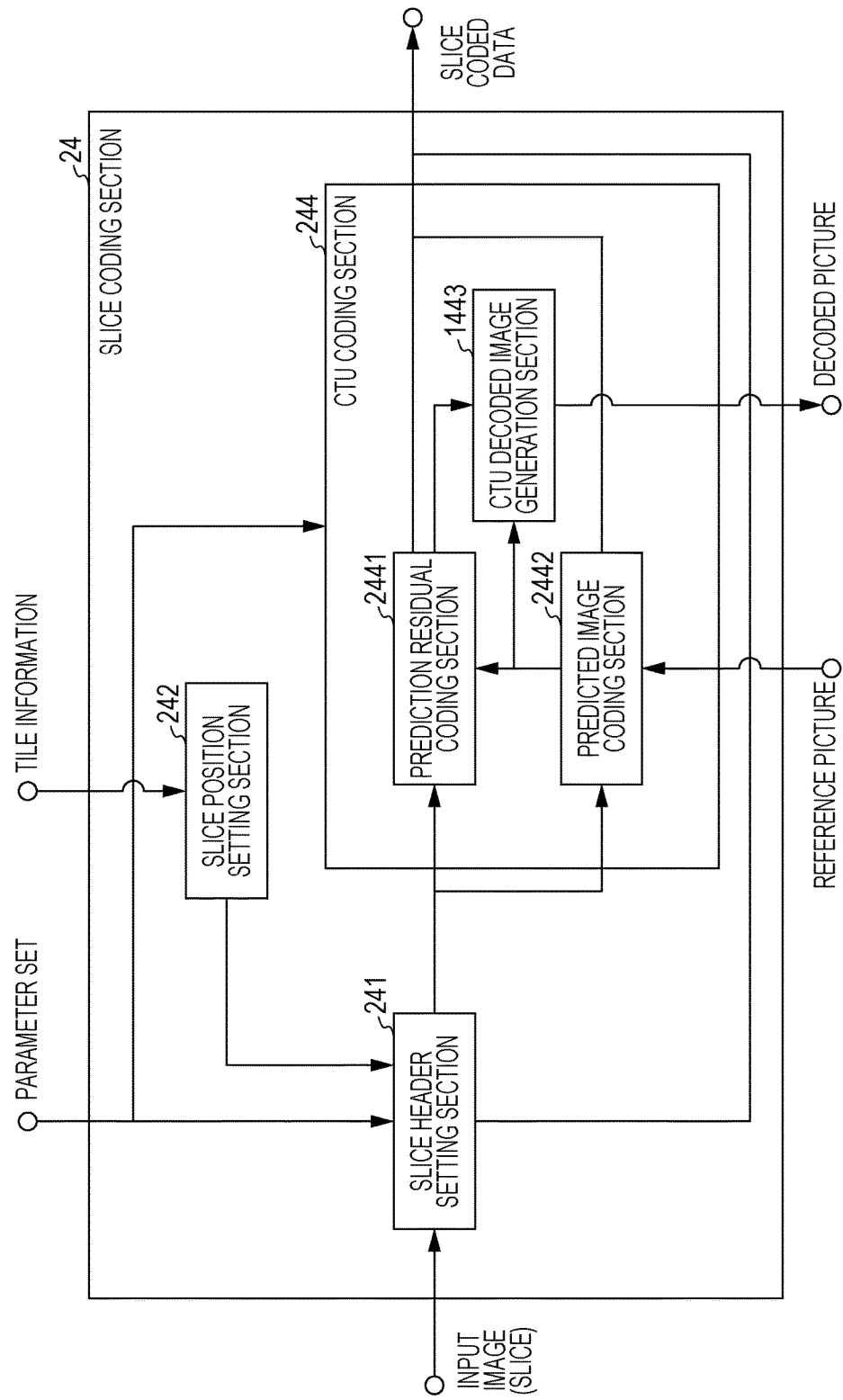
FIG. 13 is a functional block diagram exemplifying the configuration of a slice coding section included in the hierarchical moving image coding device.

Next, the details of the configuration of the slice coding section 24 will be described with reference to FIG. 13. FIG. 13 is a functional block diagram illustrating a schematic configuration of the slice coding section 24.

As illustrated in FIG. 13, the slice coding section 24 includes a slice header setting section 241, a slice position setting section 242, and a CTU coding section 244. The CTU coding section 244 contains a prediction residual coding section 2441, a predicted image coding section 2442, and a CTU decoded image generation section 1443.

The slice header setting section 241 generates a slice header which is used to code the input image in a slice unit based on the input parameter set and slice position information. The generated slice header is output as a part of slice coded data and is supplied in conjunction with the input image to the CTU coding section 244.

The slice header generated by the slice header setting section 241 includes at least SH slice position information.

The slice position setting section 242 decides a slice position in the picture based on the input tile information and supplies the slice position to the slice header setting section 241.

The CTU coding section 244 codes the input image (target slice portion) in a CTU unit based on the input parameter set and slice header to generate slice data and a decoded image (decoded picture) related to the target slice and outputs the slice data and the decoded image. The coding of the CTU is performed by the predicted image coding section 2442, the prediction residual coding section 2441, and the CTU decoded image generation section.

The predicted image coding section 2442 decides a prediction scheme and a prediction parameter of a target CTU included in the target slice, generates a predicted image based on the decided prediction scheme, and outputs the predicted image to the prediction residual coding section 2441 and the CTU decoded image generation section 1443. Information regarding the prediction scheme or the prediction parameter is subjected to variable-length coding as prediction information (PT information) and is output as a part of the slice data included in the slice coded data. The prediction scheme which can be selected by the predicted image coding section 2442 includes at least inter-layer image prediction.

In a case in which the inter-layer image prediction is selected as the prediction scheme, the predicted image coding section 2442 performs a correspondence reference position derivation process, decides a reference layer pixel position corresponding to a prediction target pixel, and decides a prediction pixel value through an interpolation process based on the pixel position. As the correspondence reference position derivation process, each process described in the predicted image generation section 1442 of the hierarchical moving image decoding device 1 can be applied. For example, a process of deriving the correspondence reference position based on the scaled reference layer offset information and the reference layer offset information included in the parameter set and described with reference to FIG. 1 is applied.

The prediction residual coding section 2441 outputs a quantized transform coefficient (TT information) obtained by performing transform and quantization on a difference image between the input image and the predicted image as a part of the slice data included in the slice coded data. A prediction residual is restored by applying inverse transform and inverse quantization on the quantized transform coefficient and the restored prediction residual is output to the CTU decoded image generation section 1443.

The CTU decoded image generation section 1443 has the same function as the constituent element having the same name of the hierarchical moving image decoding device 1. Therefore, the same reference numeral is given and the description thereof will be omitted.

(Advantageous Effects of Moving Image Coding Device 2)

The hierarchical moving image coding device 2 (hierarchical image coding device) according to the above-described embodiment includes the parameter set coding section 22 that codes the parameter set and the predicted image coding section 2442 that generates a predicted image through the inter-layer prediction with reference to the decoded pixels of the reference layer picture. The parameter set coding section 22 decodes the scaled reference layer offset coded in the chroma pixel unit. The predicted image coding section 2442 derives the scaled reference layer offset by the product of the value of the scaled reference layer offset syntax and the luminance chroma size ratio of the target layer, calculates the scale based on the scaled reference layer offset, derives the correspondence reference position with reference to the scale, and performs the inter-layer prediction.

Accordingly, in a case in which the color format of the target picture is 4:2:0 or 4:2:2, the hierarchical moving image coding device 2 can code the value of the reference layer offset syntax from a less code amount of codes than in a case in which the reference layer offset syntax is coded in the luminance pixel unit. Further, in a case in which the color format of the reference picture is 4:4:4, the hierarchical moving image coding device 2 can code the reference layer offset syntax with higher precision, that is, luminance one-pixel precision, than in a case in which the reference layer offset syntax is coded in a luminance two-pixel unit.

(Examples of Application to Other Hierarchical Moving Image Coding/Decoding Systems)

The above-described hierarchical moving image coding device 2 and hierarchical moving image decoding device 1 can be mounted on various apparatuses transmitting, receiving, recording, and reproducing a moving image for use. The moving image may be a natural moving image captured by a camera or the like or may be an artificial moving image (including a CG and a GUI) created by a computer or the like.

Figure 14:
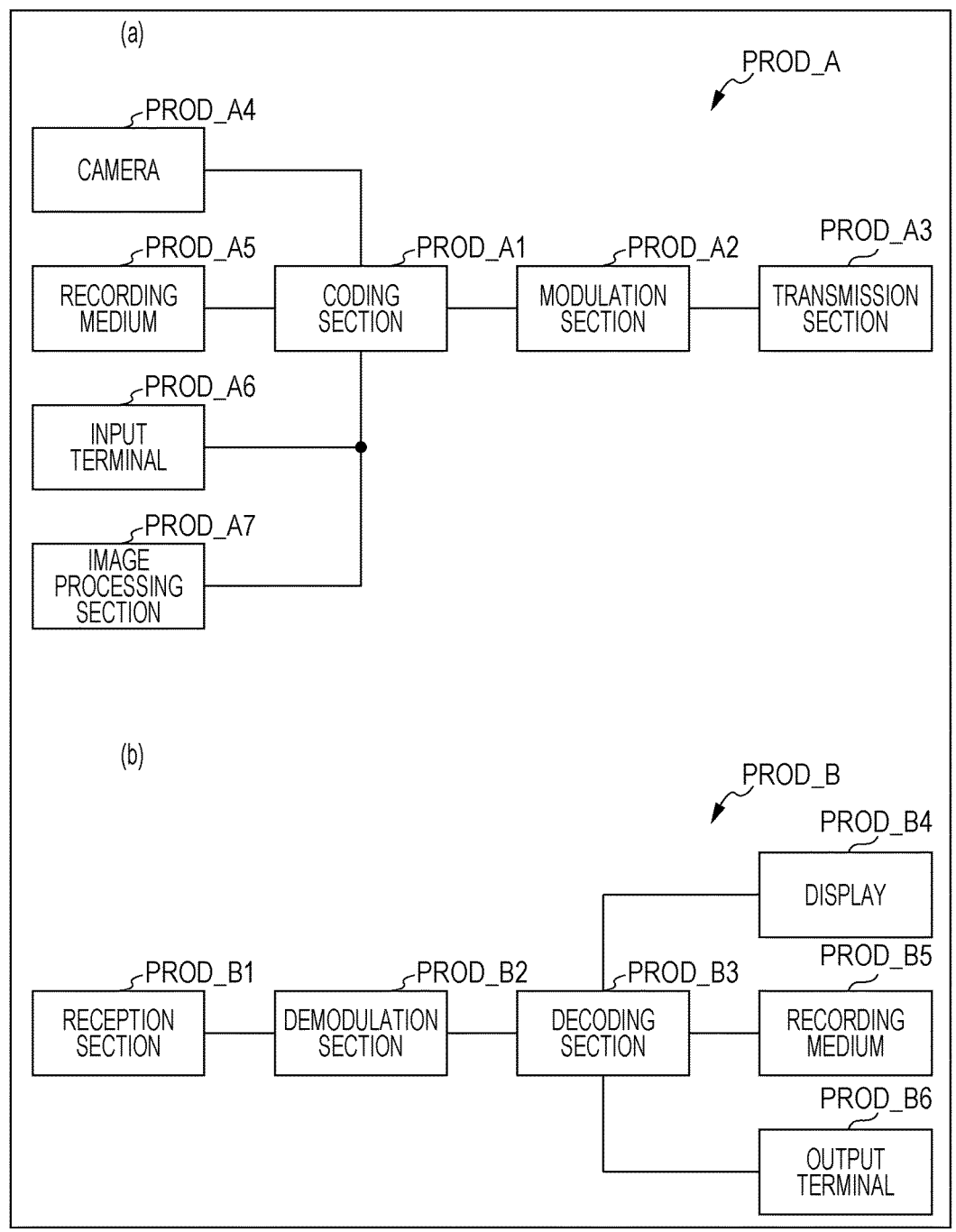
FIG. 14 is a diagram illustrating the configuration of a transmission apparatus on which the hierarchical moving image coding device is mounted and the configuration of a reception apparatus on which the hierarchical moving image decoding device is mounted.

First, the above-described hierarchical moving image coding device 2 and hierarchical moving image decoding device 1 which can be used to transmit and receive a moving image will be described with reference to FIG. 14. FIG. 14(a) is a block diagram illustrating the configuration of a transmission apparatus PROD_A on which the hierarchical moving image coding device 2 is mounted.

As illustrated in FIG. 14(a), a transmission apparatus PROD_A includes a coding section PROD_A1 that obtains coded data by coding a moving image, a modulation section PROD_A2 and that obtains a modulation signal by modulating carrier waves using the coded data obtained by the coding section PROD_A1, and a transmission section PROD_A3 that transmits the modulation signal obtained by the modulation section PROD_A2. The above-described hierarchical moving image coding device 2 is used as the coding section PROD_A1.

The transmission apparatus PROD_A may further include a camera PROD_A4 that captures a moving image as a supply source of a moving image input to the coding section PROD_A1, a recording medium PROD_A5 that records the moving image, an input terminal PROD_A6 that inputs the moving image from the outside, and an image processing section A7 that generates or processes an image. In FIG. 14(a), the configuration of the transmission apparatus PROD_A including all of the sections is exemplified, but some of the sections may be omitted.

The recording medium PROD_A5 may be a recording medium that records an uncoded moving image or may be a recording medium that records a moving image coded according to a coding scheme for recording different from a coding scheme for transmission. In the latter case, a decoding section (not illustrated) that decodes coded data read from the recoding medium PROD_A5 according to the coding scheme for recording may be interposed between the recording medium PROD_A5 and the coding section PROD_A1.

FIG. 14(b) is a block diagram illustrating a reception apparatus PROD_B on which the hierarchical moving image decoding device 1 is mounted. As illustrated in FIG. 14(b), the reception apparatus PROD_B includes a reception section PROD_B1 that receives a modulated signal, a demodulation section PROD_B2 that obtains coded data by demodulating the modulated signal received by the reception section PROD_B1, and a decoding section PROD_B3 that obtains a moving image by decoding the coded data obtained by the demodulation section PROD_B2. The above-described hierarchical moving image decoding device 1 is used as the decoding section PROD_B3.

The reception apparatus PROD_B may further include a display PROD_B4 that displays the moving image as a supply destination of the moving image output by the decoding section PROD_B3 a recording medium PROD_B5 that records the moving image, and an output terminal PROD_B6 that outputs the moving image to the outside. In FIG. 14(b), the configuration of the reception device PROD_B including all of these sections is exemplified, but some of the sections may be omitted.

The recording medium PROD_B5 may be a recording medium that records an uncoded moving image or may be a recording medium that records a moving image coded according to a coding scheme for recording different from a coding scheme for transmission. In the latter case, a coding section (not illustrated) that codes the moving image acquired from the decoding section PROD_B3 according to the coding scheme for recording may be interposed between the decoding section PROD_B3 and the recording medium PROD_B5.

A transmission medium through which a modulated signal is transmitted may be a wireless medium or a wired medium. A transmission form in which a modulated signal is transmitted may be broadcasting (here, a transmission form in which a transmission designation is not specified in advance) or may be communication (here, a transmission form in which a transmission destination is specified in advance). That is, the transmission of the modulated signal may be realized by any one of wireless broadcasting, wired broadcasting, wireless communication, and wired communication.

For example, a broadcast station (broadcast equipment or the like)/reception station (a television receiver or the like) for terrestrial digital broadcasting is an example of the transmission apparatus PROD_A/reception apparatus PROD_B transmitting or receiving a modulated signal by wireless broadcasting. Further, a broadcast station (broadcast equipment or the like)/reception station (television receiver or the like) for cable television broadcasting is an example of the transmission apparatus PROD_A/reception apparatus PROD_B transmitting or receiving a modulated signal by wired broadcasting.

A server (a workstation or the like)/client (a television receiver, a personal computer, a smartphone, or the like) for a video on demand (VOD) service in which the Internet is used, a moving image sharing service, or the like is an example of the transmission apparatus PROD_A/reception apparatus PROD_B transmitting or receiving a modulated signal by communication (typically, one of wireless and wired media is used as a transmission medium in a LAN and a wired medium is used as a transmission medium in a WAN). Here, the personal computer includes a desktop PC, a laptop PC, and a tablet PC. The smartphone also includes a multi-function portable phone terminal.

The client for the moving image sharing service has not only a function of decoding coded data downloaded from the server and displays the coded data on a display but also a function of coding a moving image captured by a camera and uploading the coded moving image to the server. That is, the client for the moving image sharing service functions as both of the transmission apparatus PROD_A and the reception apparatus PROD_B.

Figure 15:
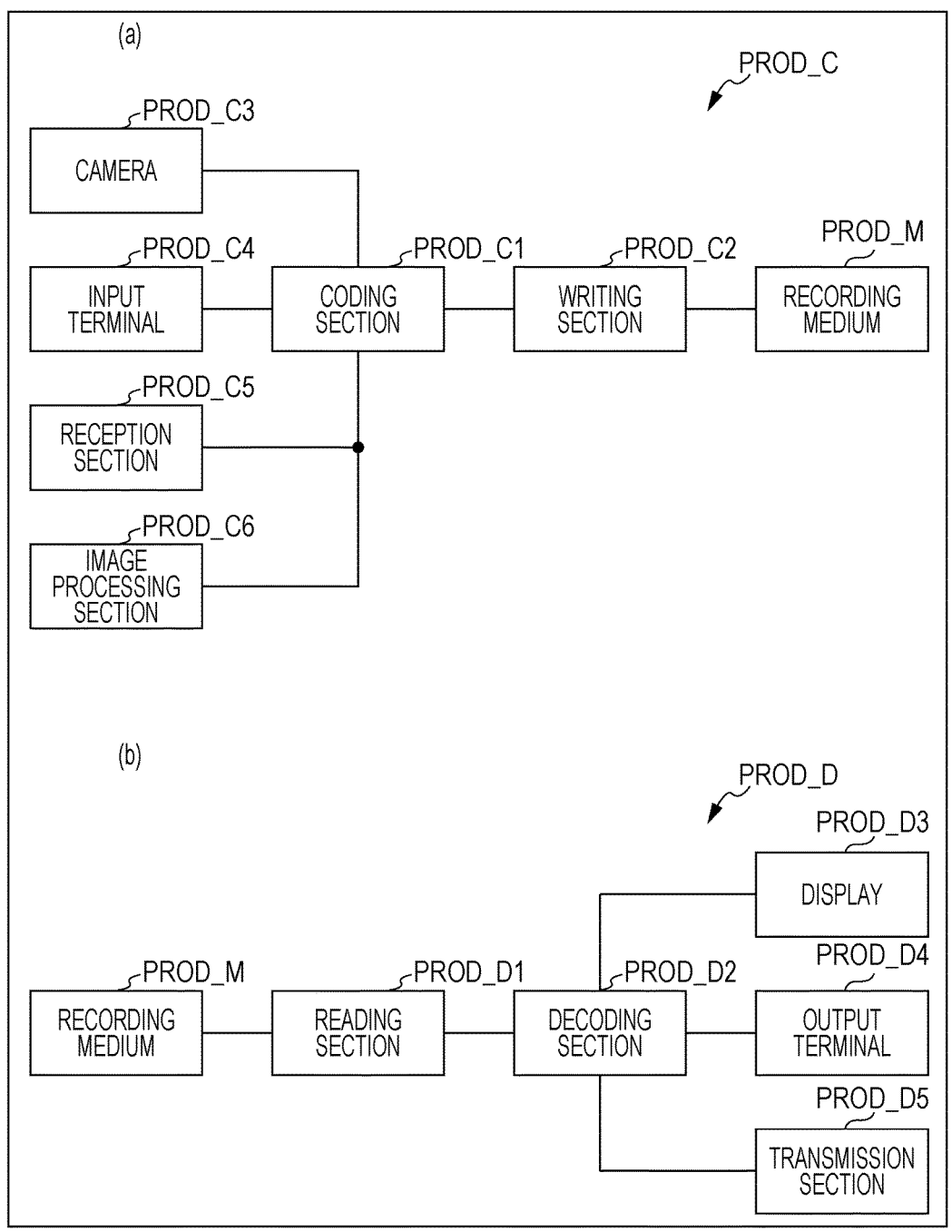
FIG. 15 is a diagram illustrating the configuration of a recording apparatus on which the hierarchical moving image coding device is mounted and the configuration of a reproduction apparatus on which the hierarchical moving image decoding device is mounted.

The above-described hierarchical moving image coding device 2 and hierarchical moving image decoding device 1 which can be used to record and reproduce a moving image will be described with reference to FIG. 15. FIG. 15(a) is a block diagram illustrating the configuration of a recording apparatus PROD_C on which the above-described hierarchical moving image coding device 2 is mounted.

As illustrated in FIG. 15(a), the recording apparatus PROD_C includes a coding section PROD_C1 that obtains coded data by coding a moving image and a writing section PROD_C2 that writes the coded data obtained by the coding section PROD_C1 on a recording medium PROD_M. The above-described hierarchical moving image coding device 2 is used as the coding section PROD_C1.

The recording medium PROD_M may be (1) a type of medium included in the recording apparatus PROD_C, such as a hard disk drive (HDD) or a solid state drive (SSD), may be (2) a type of medium connected to the recording apparatus PROD_C, such as an SD memory card or a Universal Serial Bus (USB) flash memory, or may be (3) a medium loaded on a drive device (not illustrated) included in the recording apparatus PROD_C, such as a Digital Versatile Disc (DVD) or a Blu-ray (registered trademark) disc (BD).

The recording apparatus PROD_C may further include a camera PROD_C3 that captures a moving image as a supply source of a moving image to be input to the coding section PROD_C1, an input terminal PROD_C4 that inputs a moving image from the outside, a reception section PROD_C5 that receives a moving image, and an image processing section C6 that generates or processes an image. In FIG. 15(a), the configuration of the recording apparatus PROD_C including all of the sections is exemplified, but some of the sections may be omitted.

The reception section PROD_C5 may be a reception section that receives an uncoded moving image or may be a reception section that receives coded data coded according to a coding scheme for transmission different from a coding scheme for recording. In the latter case, a decoding section (not illustrated) for transmission that decodes the coded data coded according to the coding scheme for transmission may be interposed between the reception section PROD_C5 and the coding section PROD_C1.

Examples of the recording apparatus PROD_C include a DVD recorder, a BD recorder, and a Hard Disk Drive (HDD) recorder (in this case, the input terminal PROD_C4 or the reception PROD_C5 is a main supply source of a moving image). A camcorder (in this case, the camera PROD_C3 is a main supply source of a moving image), a personal computer (in this case, the reception section PROD_C5 or the image processing section C6 is a main supply source of a moving image), a smartphone (in this case, the camera PROD_C3 or the reception section PROD_C5 serves a main supply source of a moving image), and the like are also examples of the recording apparatus PROD_C.

FIG. 15(b) is a block diagram illustrating the configuration of a reproduction apparatus PROD_D on which the above-described hierarchical moving image decoding device 1 is mounted. As illustrated in FIG. 15(b), the reproduction apparatus PROD_D includes a reading section PROD_D1 that reads coded data written on a recording medium PROD_M and a decoding section PROD_D2 that obtains a moving image by decoding the coded data read by the reading section PROD_D1. The above-described hierarchical moving image decoding device 1 is used as the decoding section PROD_D2.

The recording medium PROD_M may be (1) a type of medium included in the reproduction apparatus PROD_D, such as an HDD or an SSD, may be (2) a type of medium connected to the reproduction apparatus PROD_D, such as an SD memory card or a USB flash memory, or may be (3) a medium loaded on a drive device (not illustrated) included in the reproduction apparatus PROD_D, such as a DVD or a BD.

The reproduction apparatus PROD_D may further include a display PROD_D3 that displays a moving image as a supply destination of the moving image output by the decoding section PROD_D2, an output terminal PROD_D4 that outputs the moving image to the outside, and a transmission section PROD_D5 that transmits the moving image. In FIG. 15(b), the configuration of the reproduction apparatus PROD_D including all of the sections is exemplified, but some of the sections may be omitted.

The transmission section PROD_D5 may be a transmission section that transmits an uncoded moving image or may be a transmission section that transmits the coded data coded according to a coding scheme for transmission different from a coding scheme for recording. In the latter case, a coding section (not illustrated) that codes a moving image according to the coding scheme for transmission may be interposed between the decoding section PROD_D2 and the transmission section PROD_D5.

Examples of the reproduction apparatus PROD_D include a DVD player, a BD player, and an HDD player (in this case, the output terminal PROD_D4 connected to a television receiver or the like is a main supply destination of a moving image). A television receiver (in this case, the display PROD_D3 is a main supply destination of a moving image), a digital signage (which is also referred to as an electronic signboard or an electronic bulletin board and the display PROD_D3 or the transmission section PROD_D5 is a main supply destination of a moving image), a desktop PC (in this case, the output terminal PROD_D4 or the transmission section PROD_D5 is a main supply destination of a moving image), a laptop or tablet PC (in this case, the display PROD_D3 or the transmission section PROD_D5 is a main supply destination of a moving image), a smartphone (in this case, the display PROD_D3 or the transmission section PROD_D5 is a main supply destination of a moving image), and the like are examples of the reproduction apparatus PROD_D.

(Hardware Realization and Software Realization)

Finally, blocks of the hierarchical moving image decoding device 1 and the hierarchical moving image coding device 2 may be realized by hardware such as a logical circuit formed on an integrated circuit (IC chip) or may be realized by software using a central processing unit (CPU).

In the latter case, each of the foregoing devices includes a CPU that executes a command of a control program realizing each function, a read-only memory (ROM) that stores the program, a random access memory (RAM) on which the program is loaded, and a storage device (recording medium) such as a memory that stores the program and various kinds of data. An object of the present invention can also be achieved by providing each of the foregoing devices with a recording medium that records a program code (an execution format program, an intermediate code program, or a source program) of a control program of each of the foregoing devices which is software realizing the above-described functions in a computer-readable manner and by causing a computer (a CPU or an MPU (Micro Processing Unit)) to read and execute the program code recorded on the recording medium.

As the recording medium, for example, a kind of tape such as a magnetic tape or a cassette tape, a kind of disc including a magnetic disk such as floppy (registered trademark) disk/hard disk and an optical disc such as Compact Disc Read-Only Memory (CD-ROM)/Magneto-Optical Disc (MO discs)/Mini Disc (MD)/Digital Versatile Disk (DVD)/CD Recordable (CD-R), a kind of card such as an IC card (including a memory card)/optical card, a kind of semiconductor memory such as mask ROM/Erasable Programmable Read-Only Memory (EPROM)/Electrically Erasable and Programmable Read-Only Memory (EEPROM) (registered trademark)/flash ROM, or a kind of logical circuit such as a Programmable Logic device (PLD) or a Field Programmable Gate Array (FPGA) can be used.

Each of the foregoing devices may be configured to be connected to a communication network and the program code may be supplied via the communication network. The communication network may be able to transmit the program code and is not particularly limited. For example, the Internet, an intra-net, an extra-net, a local area network (LAN), an integrated services digital network (ISDN), a value-added network (VAN), a community antenna television (CATV) communication network, a virtual private network, a telephone circuit network, a mobile communication network, or a satellite communication network can be used. A transmission medium that configures the communication network may be a medium capable of transmitting the program code and is not particularly limited to a specific configuration or a kind of medium. For example, a wired medium such as Institute of Electrical and Electronic Engineers (IEEE) 1394, a USB, power line broadcasting, a cable TV circuit line, a telephone line, or an asymmetric digital subscriber line (ADSL) circuit, an infrared medium such as infrared data association (IrDA) or a remote controller, or a wireless medium such as Bluetooth (registered trademark), IEEE 802.11 wireless, high data rate (HDR), near field communication (NFC), digital living network alliance (DLNA), a portable telephone network, a satellite circuit, or a terrestrial digital network can be used. The present invention can also be realized in a form of a computer data signal in which the program code is embodied through electronic transmission and is embedded in a carrier wave.

The present invention is not limited to the above-described embodiments, but may be modified in various forms within the scope indicated by the claims. Embodiments obtained by properly combining technical means disclosed in different embodiments are also included in the technical scope of the present invention.

[Supplements]

The present invention can be expressed as follows.

In order to resolve the foregoing problems, an image decoding device according to the present invention decodes coded data that is hierarchically coded to restore a decoded picture of a higher layer which is a target layer. The image decoding device includes: a parameter set decoding section that decodes a parameter set; and a predicted image generation section that generates a predicted image by inter-layer prediction with reference to decoded pixels of a reference layer picture. The parameter set decoding section decodes a color format of a target layer picture and derives a luminance chroma size ratio of a target layer picture based on the color format. The parameter set decoding section decodes a scaled reference layer offset syntax which is coded in a chroma pixel unit of the target layer. The predicted image generation section derives a scaled reference layer offset by a product of a value of the scaled reference layer offset syntax and the luminance chroma size ratio of the target layer picture, calculates a scale based on the scaled reference layer offset, derives a correspondence reference position with reference to the scale, and performs the inter-layer prediction.

In the image decoding device, the parameter set decoding section may decode a color format of the reference layer picture and derive a luminance chroma size ratio of the reference layer picture based on the color format. The parameter set decoding section may decode a reference layer offset syntax coded in a chroma pixel unit of a reference layer. The predicted image generation section may derive a reference layer offset by a product of a value of the reference layer offset syntax and a luminance chroma size ratio of the reference layer picture, calculate a scale based on the reference layer offset, derive a correspondence reference position with reference to the scale, and perform the inter-layer prediction.

In the image decoding device, the predicted image generation section may set the product of the scaled reference layer offset syntax and the luminance chroma size ratio of the target layer picture as the scaled reference layer offset in a case in which a target of a predicted image generation process is a luminance pixel, and may set the value of the scaled reference layer offset syntax as the scaled reference layer offset in a case in which the target of the predicted image generation process is a chroma pixel.

In the image decoding device, the predicted image generation section may set the product of the reference layer offset syntax and the luminance chroma size ratio of the reference layer picture as the reference layer offset in a case in which a target of a predicted image generation process is a luminance pixel, and may set the value of the reference layer offset syntax as the reference layer offset in a case in which the target of the predicted image generation process is a chroma pixel.

In the image decoding device, in a case in which the parameter set decoding section omits to decode the reference layer offset syntax, the predicted image generation section may set a value obtained by converting a value of the scaled reference layer offset based on a ratio between sizes of the target layer picture and the reference layer picture as the value of the reference layer offset.

In the image decoding device, the parameter set decoding section may decode the scaled reference layer offset syntax from either a PPS or a slice header and decode the reference layer offset syntax from a VPS or an SPS.

In order to resolve the foregoing problems, an image coding device according to the present invention generates coded data of a higher layer which is a target layer from an input image. The image coding device includes: a parameter set coding section that codes a parameter set; and a predicted image generation section that generates a predicted image by inter-layer prediction with reference to decoded pixels of a reference layer picture. The parameter set coding section codes a color format of a target layer picture and derives a luminance chroma size ratio of the target layer picture based on the color format. The parameter set coding section codes a scaled reference layer offset syntax in a chroma pixel unit of the target layer. The predicted image generation section derives a scaled reference layer offset by a product of a value of the scaled reference layer offset syntax and the luminance chroma size ratio of the target layer picture, calculates a scale based on the scaled reference layer offset, derives a correspondence reference position with reference to the scale, and performs the inter-layer prediction.

INDUSTRIAL APPLICABILITY

The present invention can be applied to a hierarchical image decoding device that decodes coded data in which image data is hierarchically coded and a hierarchical image coding device that generates the coded data in which the image data is hierarchically coded. The present invention can also be applied to a data structure of hierarchically coded data which is generated by the hierarchical image coding device and is referred to by the hierarchical image decoding device.

REFERENCE SIGNS LIST 1 hierarchical moving image decoding device (image decoding device)
11 NAL demultiplexing section
12 parameter set decoding section
13 tile setting section
14 slice decoding section
141 slice header decoding section
142 Slice position setting section
144 CTU decoding section
1441 prediction residual restoration section
1442 predicted image generation section
1443 CTU decoded image generation section
15 base decoding section
151 base NAL demultiplexing section
152 base parameter set decoding section
153 base tile setting section
154 base slice decoding section
156 base decoded picture management section
16 decoded picture management section
2 hierarchical moving image coding device (image coding device)
21 NAL multiplexing section
22 parameter set coding section
23 tile setting section
24 slice coding section
241 slice header setting section
242 slice position setting section
244 CTU coding section
2441 prediction residual coding section
2442 predicted image coding section (predicted image generation section)

The invention claimed is:

1. An image decoding device that decodes coded data that is hierarchically coded to reconstruct a decoded picture of a higher layer which is a target layer, the image decoding device comprising:
a parameter set decoding circuit that decodes a parameter set; and
a predicted image generation circuit that generates a predicted image by inter-layer prediction with reference to decoded pixels of a reference layer picture,
wherein the parameter set decoding circuit decodes a color format identifier and derives a luma chroma width ratio depending upon a chroma format, which is specified by the color format identifier,
wherein the parameter set decoding circuit decodes: (i) a scaled reference layer offset syntax which is decoded in a chroma pixel unit of the target layer picture, and (ii) a reference layer offset syntax which is decoded in a chroma pixel unit of the reference layer picture,
wherein the scaled reference layer offset syntax specifies an offset between a top-left sample of a reference region in the target layer picture and a top-left sample of the target layer picture, and the reference layer offset syntax specifies an offset between a top-left sample of the reference region in the reference layer picture and a top-left sample of the reference layer picture,
wherein the predicted image generation circuit derives a reference position by using a scaled reference layer offset, a reference layer offset, and a scale,
wherein the scaled reference layer offset is derived by multiplying a value of the scaled reference layer offset syntax by a first luma chroma width ratio that is set to the luma chroma width ratio of the target layer picture,
wherein the reference layer offset is derived by multiplying a value of the reference layer offset syntax by a second luma chroma width ratio that is set to the luma chroma width ratio of the reference layer picture, and
wherein the scale is derived by using the scaled reference layer offset and the reference layer offset.

2. An image coding device that generates coded data of a higher layer which is a target layer from an input image, the image coding device comprising:
a parameter set coding circuit that codes a parameter set; and
a predicted image generation circuit that generates a predicted image by inter-layer prediction with reference to decoded pixels of a reference layer picture,
wherein the parameter set coding circuit codes a color format identifier and derives a luma chroma width ratio depending upon a chroma format, which is specified by the color format identifier,
wherein the parameter set coding circuit codes a scaled reference layer offset syntax which is coded in a chroma pixel unit of the target layer picture and a reference layer offset syntax which is coded in a chroma pixel unit of the reference layer picture,
wherein the scaled reference layer offset syntax specifies an offset between a top-left sample of a reference region in the target layer picture and a top-left sample of the target layer picture, and the reference layer offset syntax specifies an offset between a top-left sample of the reference region in the reference layer picture and a top-left sample of the reference layer picture,
wherein the predicted image generation circuit derives a reference position by using a scaled reference layer offset, a reference layer offset, and a scale,
wherein the scaled reference layer offset is derived by multiplying a value of the scaled reference layer offset syntax by a first luma chroma width ratio that is set to the luma chroma width ratio of the target layer picture,
wherein the reference layer offset is derived by multiplying a value of the reference layer offset syntax by a second luma chroma width ratio that is set to the luma chroma width ratio of the reference layer picture, and
wherein the scale is derived by using the scaled reference layer offset and the reference layer offset.

3. An image decoding method for decoding coded data that is hierarchically coded to reconstruct a decoded picture of a higher layer which is a target layer, the image decoding method comprising:

decoding a color format identifier;

deriving a luma chroma width ratio depending upon a chroma format, which is specified by the color format identifier;

decoding a scaled reference layer offset syntax which is decoded in a chroma pixel unit of the target layer picture and a reference layer offset syntax which is decoded in a chroma pixel unit of a reference layer picture;

wherein the scaled reference layer offset syntax specifies an offset between a top-left sample of a reference region in the target layer picture and a top-left sample of the target layer picture, and the reference layer offset syntax specifies an offset between a top-left sample of the reference region in the reference layer picture and a top-left sample of the reference layer picture;

deriving a scaled reference layer offset by multiplying a value of the scaled reference layer offset syntax by a first luma chroma width ratio that is set to the luma chroma width ratio of the target layer picture;

deriving a reference layer offset by multiplying a value of the reference layer offset syntax by a second luma chroma width ratio that is set to the luma chroma width ratio of the reference layer picture, deriving a scale by using the scaled reference layer offset and the reference layer offset;

deriving a reference position by using the scaled reference layer offset, the reference layer offset, and the scale; and generating a predicted image by inter-layer prediction.

4. An image coding method for generating coded data of a higher layer which is a target layer from an input image, the image coding method comprising:

coding a color format identifier;

deriving a luma chroma width ratio depending on a chroma format, which is specified by the color format identifier;

coding a scaled reference layer offset syntax which is coded in a chroma pixel unit of the target layer picture and a reference layer offset syntax which is coded in a chroma pixel unit of the reference layer picture;

wherein the scaled reference layer offset syntax specifies an offset between a top-left sample of a reference region in the target layer picture and a top-left sample of the target layer picture, and the reference layer offset syntax specifies an offset between a top-left sample of the reference region in the reference layer picture and a top-left sample of the reference layer picture;

deriving a scaled reference layer offset by multiplying a value of the scaled reference layer offset syntax by a first luma chroma width ratio that is set to the luma chroma width ratio of the target layer picture;

deriving a reference layer offset by multiplying a value of the reference layer offset syntax by a second luma chroma width ratio that is set to the luma chroma width ratio of the reference layer picture;

deriving a scale by using the scaled reference layer offset and the reference layer offset;

deriving a reference position by using the scaled reference layer offset, the reference layer offset, and the scale; and generating a predicted image by inter-layer prediction.

5. A non-transitory computer-readable recoding medium storing a program for making a computer decode coded data that is hierarchically coded to reconstruct a decoded picture of a higher layer which is a target layer, wherein the program making the computer:

decode a color format identifier;

derive a luma chroma width ratio depending upon a chroma format, which is specified by the color format identifier;

decode a scaled reference layer offset syntax which is decoded in a chroma pixel unit of the target layer picture and a reference layer offset syntax which is decoded in a chroma pixel unit of a reference layer picture;

wherein the scaled reference layer offset syntax specifies an offset between a top-left sample of a reference region in the target layer picture and a top-left sample of the target layer picture, and the reference layer offset syntax specifies an offset between a top-left sample of the reference region in the reference layer picture and a top-left sample of the reference layer picture;

derive a scaled reference layer offset by multiplying a value of the scaled reference layer offset syntax by a first luma chroma width ratio that is set to the luma chroma width ratio of the target layer picture;

derive a reference layer offset by multiplying a value of the reference layer offset syntax by a second luma chroma width ratio that is set to the luma chroma width ratio of the reference layer picture, derive a scale by using the scaled reference layer offset and the reference layer offset;

derive a reference position by using the scaled reference layer offset, the reference layer offset, and the scale; and generate a predicted image by inter-layer prediction.

6. A non-transitory computer-readable recoding medium storing a program for making a computer generate coded data of a higher layer which is a target layer from an input image, wherein the program making the computer:

code a color format identifier;

derive luma chroma width ratio depending on a chroma format, which is specified by the color format identifier;

code a scaled reference layer offset syntax which is coded in a chroma pixel unit of the target layer picture and a reference layer offset syntax which is coded in a chroma pixel unit of the reference layer picture;

wherein the scaled reference layer offset syntax specifies an offset between a top-left sample of a reference region in the target layer picture and a top-left sample of the target layer picture, and the reference layer offset syntax specifies an offset between a top-left sample of the reference region in the reference layer picture and a top-left sample of the reference layer picture;

derive a scaled reference layer offset by multiplying value of the scaled reference layer offset syntax by a first luma chroma width ratio that is set to the luma chroma size ratio of the target layer picture;

derive a reference layer offset by multiplying a value of the reference layer offset syntax by a second luma chroma width ratio that is set to the luma chroma width ratio of the reference layer picture;

derive a scale by using the scaled reference layer offset and the reference layer offset;

derive a reference position by using the scaled reference layer offset, the reference layer offset, and the scale; and generate a predicted image by inter-layer prediction.

* * * * *